United States Patent
Ohtsuka et al.

[11] Patent Number: 6,078,608
[45] Date of Patent: Jun. 20, 2000

[54] SPREAD SPECTRUM COMMUNICATION APPARATUS, SURFACE ACOUSTIC WAVE DEVICE, AND SURFACE ACOUSTIC WAVE PART

[75] Inventors: Masatoshi Ohtsuka, Fukuoka; Naoki Koga, Fukuoka-ken, both of Japan

[73] Assignee: Matsushita Electric Industrial Co., Ltd., Osaka, Japan

[21] Appl. No.: 08/908,426

[22] Filed: Aug. 7, 1997

[30] Foreign Application Priority Data

Aug. 9, 1996 [JP] Japan .................................. 8-210964

[51] Int. Cl.[7] .............................. H04B 15/00; H04K 1/00; H04L 27/30
[52] U.S. Cl. ........................................ 375/200; 310/313 R
[58] Field of Search .................................... 375/200, 207, 375/208, 206, 316, 259; 310/313 R; 333/187

[56] References Cited

U.S. PATENT DOCUMENTS

| | | | |
|---|---|---|---|
| 4,100,498 | 7/1978 | Alsup et al. | 375/206 |
| 4,164,628 | 8/1979 | Ward et al. | 375/208 |
| 5,189,330 | 2/1993 | Niitsuma | 310/313 B |
| 5,784,403 | 7/1998 | Scott | 375/207 |
| 5,909,461 | 6/1999 | Koga et al. | 375/206 |

FOREIGN PATENT DOCUMENTS

| | | |
|---|---|---|
| 377445 | 4/1991 | Japan . |
| 5316074 | 11/1993 | Japan . |
| 621752 | 1/1994 | Japan . |
| 7221670 | 8/1995 | Japan . |

*Primary Examiner*—Chi H. Pham
*Assistant Examiner*—Bryan Webster
*Attorney, Agent, or Firm*—Stevens, Davis, Miller & Mosher, L.L.P.

[57] ABSTRACT

A spread spectrum communication apparatus employs a surface acoustic wave matched filter and surface acoustic wave delay lines which enables the demodulation in accordance with the QPSK scheme. A SS demodulator has a correlated signal acquisition circuit for demodulating a received SS signal to acquire a correlated signal, first and second delay circuits for delaying an output signal from the correlated signal acquisition circuit, and first and second adder circuits for adding the output signal of the correlated signal acquisition circuit and respective outputs of the first and second delay circuits. The first delay circuit delays the input signal by $T+(\pm n+5\times a/8)/fc$, while the second delay circuit delays the input signal by $T+(\pm m-5\times a/8)/fc$. Thereby, a spread spectrum communication apparatus which enables the demodulation in accordance with the QPSK scheme by a simple configuration using a surface acoustic wave matched filter and surface acoustic wave delay lines is provided.

38 Claims, 9 Drawing Sheets

FIG.4A  D1   1 0 0 0 0 1 1 1 0 1 1 1 0
FIG.4B  D2   1 0 1 0 0 0 1 1 1 0 0 1 0 0
             A   A   B   D   A   C   B
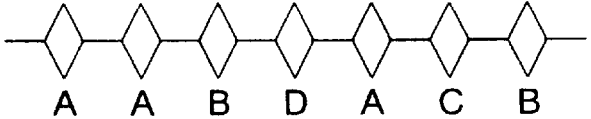
FIG.4C  S1
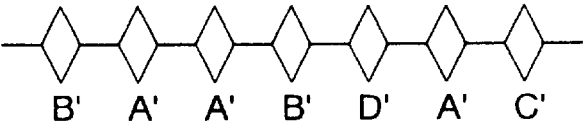
FIG.4D  S2
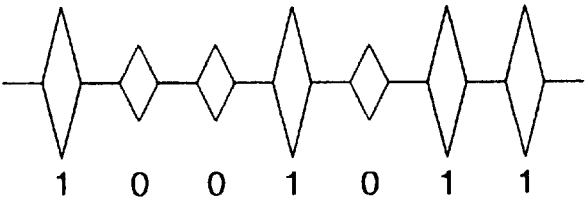
FIG.4E  S3
             1   0   0   1   0   1   1
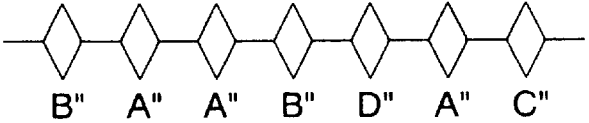
FIG.4F  S4
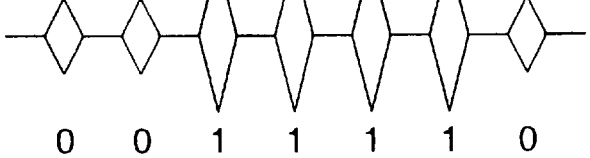
FIG.4G  S5
             0   0   1   1   1   1   0
FIG.4H  D3   1 0 0 0 0 1 1 1 0 1 1 1 0

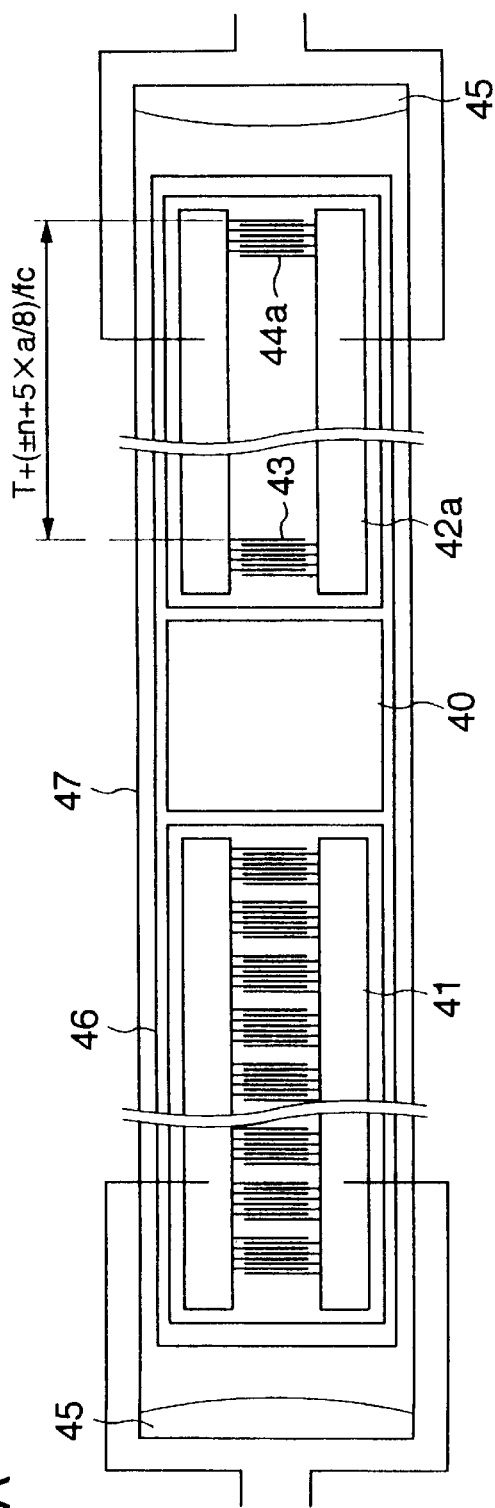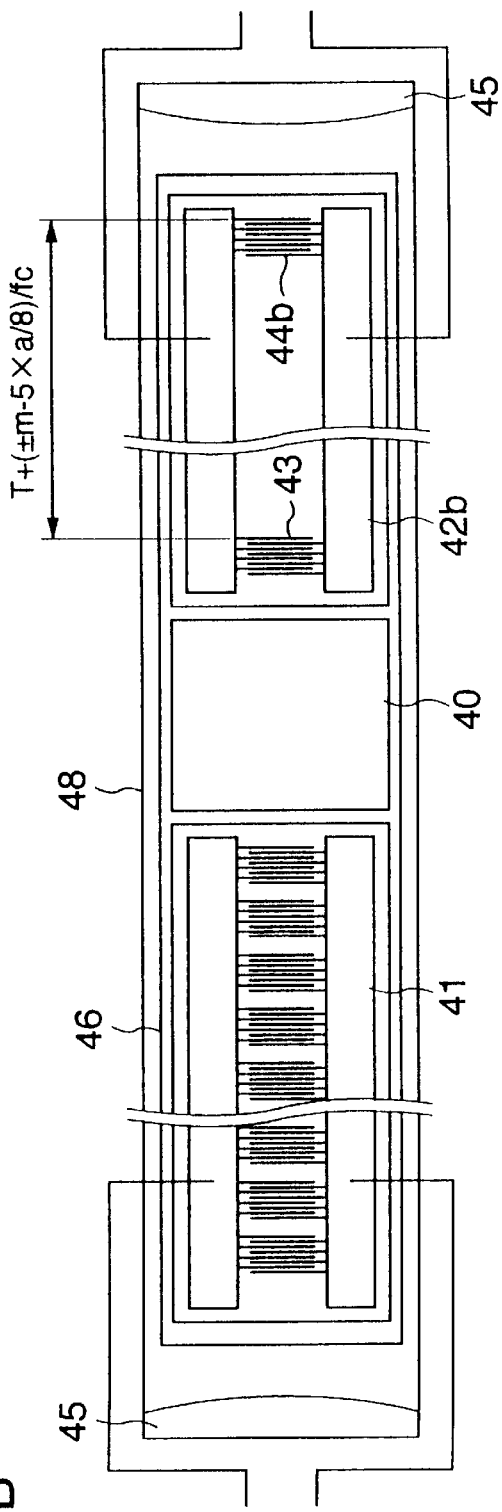

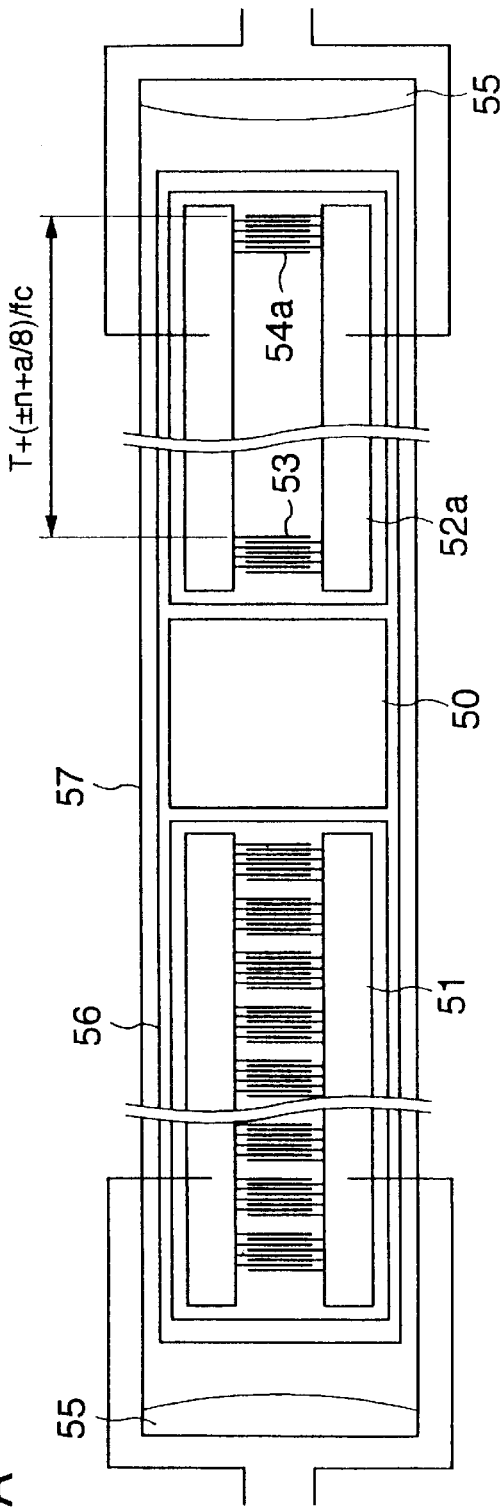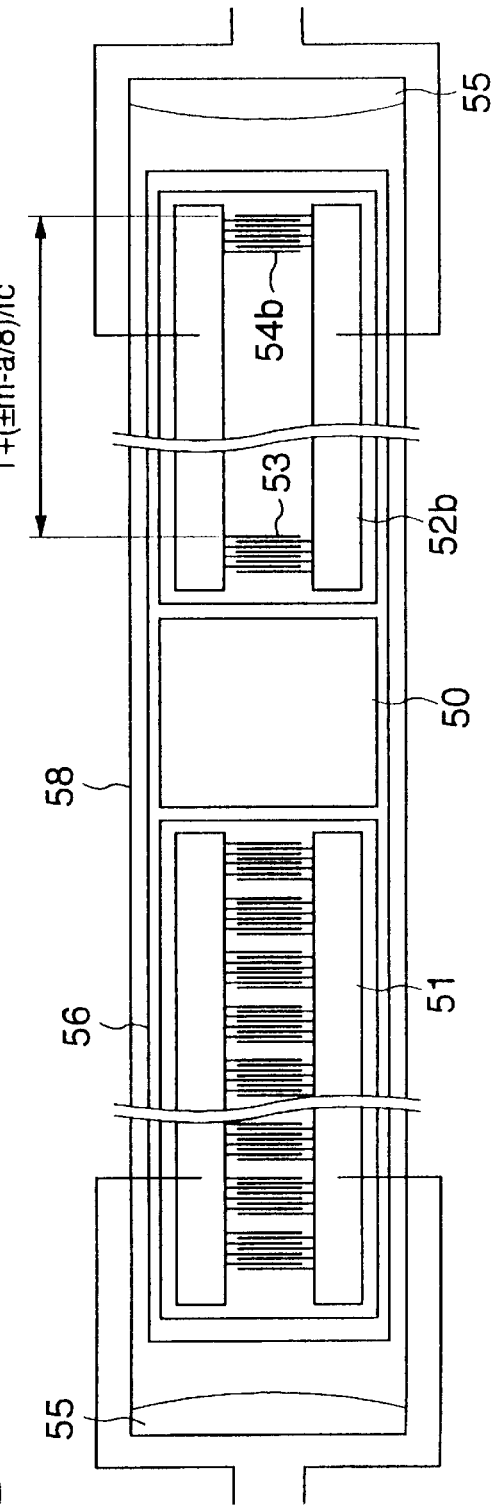

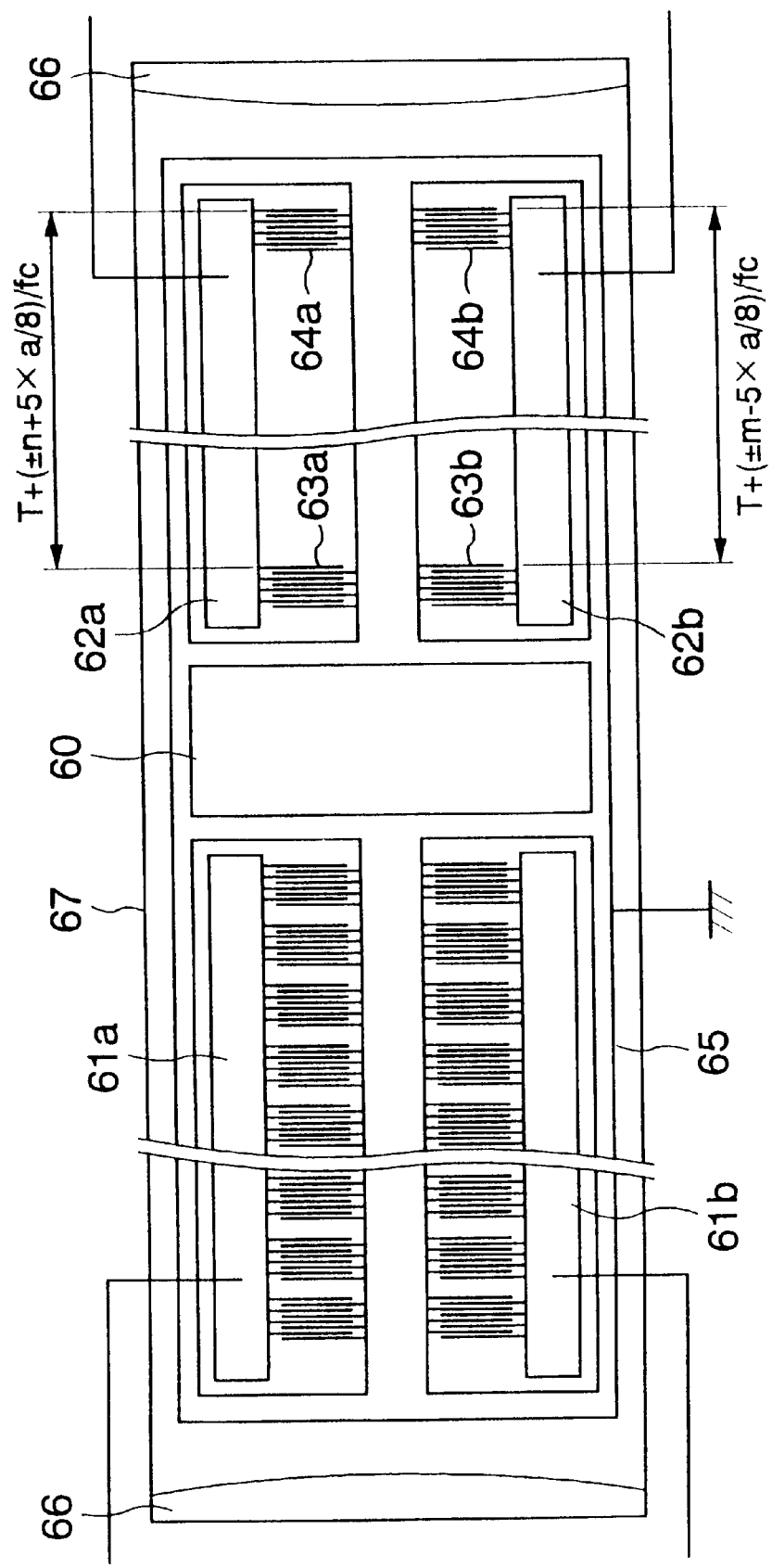

SPREAD SPECTRUM COMMUNICATION APPARATUS, SURFACE ACOUSTIC WAVE DEVICE, AND SURFACE ACOUSTIC WAVE PART

BACKGROUND OF THE INVENTION

The present invention relates to a spread spectrum (SS) communication apparatus adapted to operate in accordance with a spread spectrum communication scheme, a surface acoustic wave device for use in a SS demodulator of the communication apparatus, and a surface acoustic wave part for use in the SS demodulator.

In recent years, the spread spectrum communication scheme (SS communication scheme) has been drawing much attention as a personal use communication scheme because of its advantages of being resistant to noise and excellent in secrecy and confidentiality. The SS communication scheme generates a modulated signal by modulating information to be transmitted with a carrier signal, and multiplies the modulated signal by a predetermined code sequence at a predetermined high chip rate to perform the spread spectrum modulation (SS modulation), thereby producing a spread spectrum signal (SS signal) which acts as a transmission signal. For the spread spectrum modulation, a pseudo noise code sequence (PN code sequence), a Barker code sequence, and so on have been used as the code sequence mentioned above, and the SS modulation scheme is classified into a direct sequence (DS) scheme and a frequency hopping (FH) scheme.

In the SS communication scheme as mentioned above, the receiver side requires a demodulator for demodulating a SS signal transmitted thereto. For example, when a SS signal has been SS-modulated in accordance with the DS scheme using a PN code sequence on the transmitter side, the receiver side needs to employ the same PN code sequence as the transmitter side for demodulation. Demodulators usable in this event are classified into a demodulator utilizing ICs and a demodulator utilizing surface acoustic wave devices. Surface acoustic wave devices utilized in such demodulators have been drawing much attention since they can realize a demodulator in a simple configuration at a low cost by using the photolythographic technology.

The surface acoustic wave devices may be classified, by their configuration, into a surface acoustic wave matched filter and a surface acoustic wave convolver. Since the surface acoustic wave convolver allows a PN code sequence to be selected for demodulation, it is particularly suited for applications requiring high secrecy and confidentiality. The surface acoustic wave matched filter, although using a fixed code sequence for demodulation, is advantageous in that its peripheral circuits can be configured correspondingly simpler, and therefore the overall system can be built at a low cost, so that the surface acoustic wave matched filter is drawing attention as a component for demodulator for use in small scale SS communication systems, for example, a private wireless LAN and so on. Thus, surface acoustic wave matched filters have been proposed in a variety of shapes. Such surface acoustic wave matched filters are described for example in JP-A-3-77445, JP-A-5-316074, JP-A-6-21752, and JP-A-7-221670.

Most of demodulators employing surface acoustic wave matched filters as mentioned above support a binary phase shift keying scheme (BPSK scheme) which performs demodulation making use of the fact that the surface acoustic wave matched filter takes two polarities, for example, zero-phase and Π-phase. For use in a private wireless LAN, it is desirable that the information transmission rate is as high as possible for providing a larger amount of information. To this end, the modulation scheme is required to support an N-phase modulation scheme, which relies on plural-phase or N-phase modulation, rather than the BPSK scheme. A known demodulator supporting the N-phase modulation scheme employs, for demodulation, N or more surface acoustic wave filters corresponding to possible modulation phase values associated with the N-phase modulation. Such a demodulator is described, for example, in JP-A-7-221670.

FIG. 12 is a schematic diagram illustrating the configuration of a surface acoustic wave matched filter for use in a conventional demodulator. A QPSK scheme can provide a transmission rate twice higher than a BPSK scheme. In FIG. 12, the illustrated surface acoustic wave matched filter comprises a piezo-electric substrate 101 made of quartz, $LiNbO_3$, or the like; a first input electrode 102 of a first line; a second input electrode 103 of the first line formed at a distance of X1 (corresponding to one ($\alpha$1) of four possible phase amounts taken by the QPSK scheme) from the first input electrode 102; an output electrode 104 of the first line; a first input electrode 105 of a second line; a second input electrode 106 of the second line formed at a distance of X2 (corresponding to one ($\alpha$2) of the four possible phase amounts taken by the QPSK scheme) from the first input electrode 105; an output electrode 107 of the second line; a first input electrode 108 of a third line; a second input electrode 109 of the third line formed at a distance of X3 (corresponding to one ($\alpha$3) of the four possible phase amounts taken by the QPSK scheme) from the first input electrode 108; an output electrode 110 of the third line; a first input electrode 111 of a fourth line; a second input electrode 112 of the fourth line formed at a distance of X4 (corresponding to one ($\alpha$4) of the four possible phase amounts taken by the QPSK scheme) from the first input electrode 111; an output electrode 113 of the fourth line; a signal input terminal 114; an output terminal 115 of the first line for extracting a signal at the output electrode 104; an output terminal 116 of the second line for extracting a signal at the output electrode 107; an output terminal 117 of the third line for extracting a signal at the output electrode 110; and an output terminal 118 of the fourth line for extracting a signal at the output electrode 113.

Now, a brief description will be given of a demodulation operation in accordance with the QPSK scheme using the surface acoustic wave matched filter illustrated in FIG. 12. A QPSK modulated signal inputted to the input terminal 114 may take a modulation phase in one of four possible states, i.e., one of phase values $\alpha$1, $\alpha$2, $\alpha$3, or $\alpha$4. Then, a correlation peak is provided from the output terminal 115 of the first line in the surface acoustic wave matched filter when the modulation phase is at the phase value $\alpha$1; a correlation peak is provided from the output terminal 116 of the second line in the surface acoustic wave matched filter when at the second value $\alpha$2; a correlation peak is provided from the output terminal 117 of the third line in the surface acoustic wave matched filter when at the third value $\alpha$3; and a correlation peak is provided from the output terminal 118 of the fourth line in the surface acoustic wave matched filter when at the third value $\alpha$4. Thus, the QPSK modulated signal can be demodulated by determining which line of surface acoustic wave filter a correlation peak is outputted from.

However, the QPSK scheme needs to discriminate four phase states with phase difference of 90 degrees from one another, and moreover, a conventional demodulator cannot reproduce a QPSK signal unless it employs four surface acoustic wave delay lines having different delay amounts from one another corresponding to respective phase values, thus presenting a problem in that the demodulator is complicated.

The spread spectrum communication apparatus, surface acoustic wave device, and surface acoustic wave part are required to enable the demodulation in accordance with the QPSK scheme in a simple configuration.

It is therefore an object of the present invention to provide a spread spectrum communication apparatus capable of implementing the demodulation in accordance with the QPSK scheme in a simple configuration employing a surface acoustic wave matched filter and surface acoustic wave delay lines, a surface acoustic wave device for the QPSK scheme having a surface acoustic wave matched filter and surface acoustic wave delay lines, and a surface acoustic wave part for use in the QPSK scheme.

SUMMARY OF THE INVENTION

To solve the problem mentioned above, a spread spectrum communication apparatus according to the present invention has a SS modulator for converting transmission data into a SS signal using a predetermined code sequence, and a SS demodulator for demodulating a received SS signal to original data, wherein the SS demodulator comprises a correlated signal acquisition circuit for demodulating the received SS signal to acquire a correlated signal, first and second delay circuits for delaying an output signal from the correlated signal acquisition circuit, and first and second adder circuits for adding the output of the correlated signal acquisition circuit and an output signal of the first delay circuit and for adding the output signal of the correlated signal acquisition circuit and an output signal of the second delay circuit, respectively, wherein the first delay circuit delays an input signal by a time period expressed by $T+(\pm n+5\times a/8)/fc$, where T represents one period of a received signal to be demodulated; fc represents a carrier frequency of a signal inputted to the signal input coding electrode; n represents an integer including zero equal to or less than the value of (2×carrier frequency fc/chip rate); and a is a value in a range of $\frac{1}{2} \leq a \leq \frac{3}{2}$, and the second delay circuit delays an input signal by a time period expressed by $T+(\pm m-5\times a/8)/fc$, where m represents an integer including zero equal to or less than the value of (2×carrier frequency fc/chip rate).

In this way, a spread spectrum communication apparatus which enables the demodulation in accordance with the QPSK scheme can be provided in a simple configuration using a surface acoustic wave matched filter and surface acoustic wave delay lines.

To solve the problem mentioned above, a surface acoustic wave device according to the present invention has a piezo-electric substrate, a signal input coding electrode formed on the piezo-electric substrate, a first output comb-shaped electrode formed on the piezo-electric substrate at a predetermined interval from the signal input coding electrode, and a second output comb shaped electrode formed on the piezo-electric substrate at a distance of $T+(\pm n+5\times a/8)/fc$ from the first output comb-shaped electrode, where T represents one period of a received signal to be demodulated; fc represents a carrier frequency of a signal inputted to the signal input coding electrode; n represents an integer including zero equal to or less than the value of (2×carrier frequency fc/chip rate); and a is a value in a range of $\frac{1}{2} \leq a \leq \frac{3}{2}$, and having the same polarity as the first output comb-shaped electrode, wherein the first output comb-shaped electrode and the second output comb-shaped electrode are connected in parallel on the piezo-electric substrate.

Thus, a surface acoustic wave device having a surface acoustic wave matched filter and surface acoustic wave delay lines can be provided.

To solve the problem mentioned above, a surface acoustic wave part according to the present invention is configured to air-tight seal a surface acoustic wave device which has a piezo-electric substrate, a signal input coding electrode formed on the piezo-electric substrate, a first output comb-shaped electrode formed on the piezo-electric substrate at a predetermined interval from the signal input coding electrode, and a second output comb-shaped electrode formed on the piezo-electric substrate at a distance of $T+(\pm m-5\times a/8)/fc$ from the first output comb-shaped electrode, where T represents one period of a received signal to be demodulated; fc represents a carrier frequency of a signal inputted to the signal input coding electrode; m represents an integer including zero equal to or less than the value of (2×carrier frequency fc/chip rate); and a is a value in a range of $\frac{1}{2} \leq a \leq \frac{3}{2}$, and having the same polarity as the first output comb-shaped electrode, wherein the first output comb-shaped electrode and the second output comb-shaped electrode are connected in parallel on the piezo-electric substrate.

Thus, a surface acoustic wave part for QPSK scheme can be provided.

Also, to solve the problem mentioned above, a surface acoustic wave device of the present invention has a piezo-electric substrate, a signal input coding electrode formed on the piezo-electric substrate, a first output comb-shaped electrode formed on the piezo-electric substrate at a predetermined interval from the signal input coding electrode, and a second output comb-shaped electrode formed on the piezo-electric substrate at a distance of $T+(\pm n+a/8)/fc$ from the first output comb-shaped electrode, where T represents one period of a received signal to be demodulated; fc represents a carrier frequency of a signal inputted to the signal input coding electrode; n represents an integer including zero equal to or less than the value of (2×carrier frequency fc/chi. rate); and a is a value in a range of $\frac{1}{2} \leq a \leq \frac{3}{2}$, and having the opposite polarity to the first output comb-shaped electrode, wherein the first output comb-shaped electrode and the second output comb-shaped electrode are connected in parallel on the piezo-electric substrate.

In this way, a surface acoustic wave device for the QPSK scheme having a surface acoustic wave matched filter and surface acoustic wave delay lines can be provided.

BRIEF DESCRIPTION OF THE DRAWINGS

FIG. 4A is a diagram illustrating a signal sequence of an information signal (original data);

FIG. 4B is a diagram illustrating a signal sequence of a signal produced by differential-coding the information signal;

FIG. 4C is a waveform diagram illustrating an output signal of a surface acoustic wave matched filter (correlated signal acquisition circuit) in a SS demodulator;

FIG. 4D is a waveform diagram illustrating an output signal of a delay circuit in FIG. 1;

FIG. 4E is a waveform diagram illustrating an output signal of an adder circuit in FIG. 1;

FIG. 4F is a waveform diagram illustrating an output signal of another delay circuit in FIG. 1;

FIG. 4G is a waveform diagram illustrating an output signal of another adder circuit in FIG. 1;

FIG. 4H is a diagram illustrating a signal sequence of a demodulated information signal (original data);

FIG. 6A is a pattern diagram illustrating a surface acoustic wave device according to a second embodiment of the present invention;

FIG. 6B is a pattern diagram illustrating a surface acoustic wave device according to the second embodiment of the present invention;

FIG. 7A is a pattern diagram illustrating a surface acoustic wave device according to a third embodiment of the present invention;

FIG. 7B is a pattern diagram illustrating a surface acoustic wave device according to the third embodiment of the present invention;

FIG. 8 is a pattern diagram illustrating a surface acoustic wave device according to a fourth embodiment of the present invention;

DESCRIPTION OF THE PREFERRED EMBODIMENTS

Figure 1:
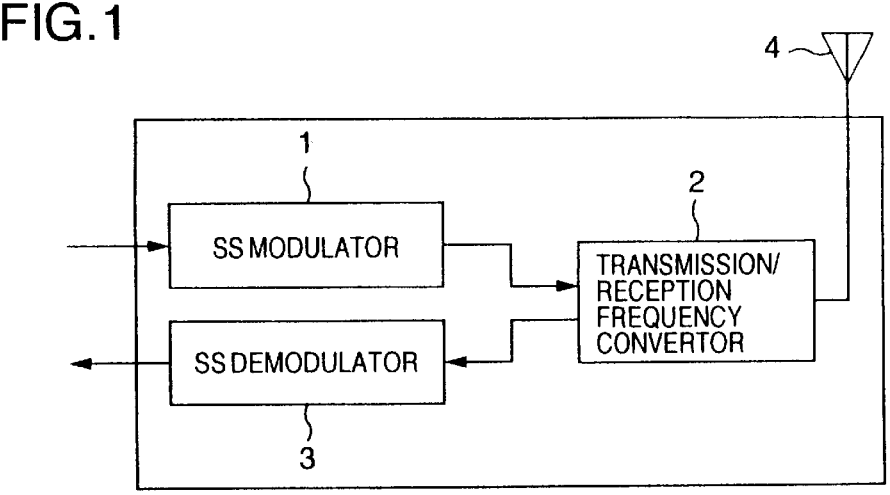
FIG. 1 is a block diagram illustrating a spread spectrum communication apparatus according to a first embodiment of the present invention.

A first invention is a spread spectrum communication apparatus having a SS modulator for converting transmission data into a SS signal using a predetermined code sequence, and a SS demodulator for demodulating a received SS signal to original data, wherein the SS demodulator comprises a correlated signal acquisition circuit for demodulating the received SS signal to acquire a correlated signal, first and second delay circuits for delaying an output signal of the correlated signal acquisition circuit, and first and second adder circuits for adding the output of the correlated signal acquisition circuit and an output signal of the first delay circuit and for adding the output signal of the correlated signal acquisition circuit and an output signal of the second delay circuit, respectively, wherein the first delay circuit delaying an input signal by a time period expressed by $T+(\pm n+5\times a/8)/fc$, where T represents one period of a received signal to be demodulated; fc represents a carrier frequency of a signal inputted to the corrected signal acquisition circuit; n represents an integer including zero equal to or less than the value of (2×carrier frequency fc/chip rate); and a is a value in a range of $½ \leq a \leq ⅜$, and the second delay circuit delaying an input signal by a time period expressed by $T+(\pm m-5\times a/8)/fc$, where m represents an integer including zero equal to or less than the value of (2×carrier frequency fc/chip rate), whereby an in-phase component of original data is demodulated from the first adder circuit, while a quadrature-phase component of the original data is demodulated from the second adder circuit.

A second invention defines in the above-mentioned first invention that the correlated signal acquisition circuit comprises a surface acoustic wave matched filter, and the delay circuits each comprise a surface acoustic wave delay line, wherein a correlated signal is acquired by the surface acoustic wave matched filter, and a signal is delayed by the surface acoustic wave delay lines.

A third invention is a surface acoustic wave device having a piezo-electric substrate, a signal input coding electrode formed on the piezo-electric substrate, a first output comb-shaped electrode formed on the piezo-electric substrate at a predetermined interval from the signal input coding electrode, and a second output comb shaped electrode formed on the piezo-electric substrate at a distance of $T+(\pm n+5\times a/8)/fc$ from the first output comb-shaped electrode, where T represents one period of a received signal to be demodulated; fc represents a carrier frequency of a signal inputted to the signal input coding electrode; n represents an integer including zero equal to or less than the value of (2×carrier frequency fc/chip rate); and a is a value in a range of $½ \leq a \leq ⅜$, and having the same polarity as the first output comb-shaped electrode, wherein the first output comb-shaped electrode and the second output comb-shaped electrode are connected in parallel on the piezo-electric substrate, whereby acquisition of a correlated signal by a surface acoustic wave matched filter, signal delays by surface acoustic wave delay lines, and additions of a non-delayed signal and respective delayed signals are achieved on the same piezo-electric substrate.

A fourth invention is a surface acoustic wave device having a piezo-electric substrate, a signal input coding electrode formed on the piezo-electric substrate, a first output comb-shaped electrode formed on the piezo-electric substrate at a predetermined interval from the signal input coding electrode, and a second output comb-shaped electrode formed on the piezo-electric substrate at a distance of $T+(\pm m-5\times a/8)/fc$ from the first output comb-shaped electrode, where T represents one period of a received signal to be demodulated; fc represents a carrier frequency of a signal inputted to the signal input coding electrode; m represents an integer including zero equal to or less than the value of (2×carrier frequency fc/chip rate); and a is a value in a range of $½ \leq a \leq ⅜$, and having the same polarity as the first output comb-shaped electrode, wherein the first output comb-shaped electrode and the second output comb-shaped electrode are connected in parallel on the piezo-electric substrate, whereby acquisition of a correlated signal by a surface acoustic wave matched filter, signal delays by surface acoustic wave delay lines, and additions of a non-delayed signal and respective delayed signals are achieved on the same piezo-electric substrate.

A fifth invention defines a surface acoustic wave device assembly comprising the surface acoustic wave devices of the third invention and the fourth invention, both of which are formed on the same substrate, whereby a SS signal for the QPSK scheme is demodulated on the same substrate.

A sixth invention defines in the third, fourth, or fifth invention that the electrodes have a double electrode structure, thereby suppressing unnecessary radiations.

A seventh invention defines that the surface acoustic wave device of the third, fourth, fifth, or sixth invention is air-tight sealed, thereby stabilizing operations of the surface acoustic wave device.

An eighth invention is a spread spectrum communication apparatus comprising a SS modulator for converting transmission data into a SS signal using a predetermined code sequence, and a SS demodulator for demodulating a received SS signal to original data, wherein the SS demodulator includes the surface acoustic wave part of the seventh invention, thereby stabilizing the operation for demodulating a SS signal for the QPSK scheme.

A ninth invention is a surface acoustic wave device having a piezo-electric substrate, a signal input coding electrode formed on the piezo-electric substrate, a first output comb-shaped electrode formed on the piezo-electric substrate at a predetermined interval from the signal input coding electrode, and a second output comb-shaped electrode formed on the piezo-electric substrate at a distance of $T+(\pm n+a/8)/fc$ from the first output comb-shaped electrode, where T represents one period of a received signal to be demodulated; fc represents a carrier frequency of a signal inputted to the signal input coding electrode; n represents an integer including zero equal to or less than the value of (2×carrier frequency fc/chip rate); and a is a value in a range of $\frac{1}{2} \leq a \leq \frac{3}{2}$, and having the opposite polarity to the first output comb-shaped electrode, wherein the first output comb-shaped electrode and the second output comb-shaped electrode are connected in parallel on the piezo-electric substrate, whereby acquisition of a correlated signal by a surface acoustic wave matched filter, signal delays by surface acoustic wave delay lines, and additions of a non-delayed signal and respective delayed signals are achieved on the same piezo-electric substrate.

A tenth invention is a surface acoustic wave device having a piezo-electric substrate, a signal input coding electrode formed on the piezo-electric substrate, a first output comb-shaped electrode formed on the piezo-electric substrate at a predetermined interval from the signal input coding electrode, and a second output comb-shaped electrode formed on the piezo-electric substrate at a distance of $T+(\pm m-a/8)/fc$ from the first output comb-shaped electrode, where T represents one period of a received signal to be demodulated; fc represents a carrier frequency of a signal inputted to the signal input coding electrode; m represents an integer including zero equal to or less than the value of (2×carrier frequency fc/chip rate); and a is a value in a range of $\frac{1}{2} \leq a \leq \frac{3}{2}$, and having the opposite polarity to the first output comb-shaped electrode, wherein the first output comb-shaped electrode and the second output comb-shaped electrode are connected in parallel on the piezo-electric substrate, whereby acquisition of a correlated signal by a surface acoustic wave matched filter, signal delays by surface acoustic wave delay lines, and additions of a non-delayed signal and respective delayed signals are achieved on the same piezo-electric substrate.

An eleventh invention defines a surface acoustic wave device assembly comprising the surface acoustic wave devices of the ninth invention and the tenth invention, both of which are formed on the same substrate, whereby a SS signal for the QPSK scheme is demodulated on the same substrate.

A twelfth invention defines in the ninth, tenth, or eleventh invention that the electrodes have a double electrode structure, thereby suppressing unnecessary radiations.

A thirteenth invention defines that the surface acoustic wave device of the third, fourth, fifth, or sixth invention is air-tight sealed, thereby stabilizing operations of the surface acoustic wave device.

A fourteenth invention is a spread spectrum communication apparatus comprising a SS modulator for converting transmission data into a SS signal using a predetermined code sequence, and a SS demodulator for demodulating a received SS signal to original data, wherein the SS demodulator includes the surface acoustic wave part of the thirteenth invention, thereby stabilizing the operation for demodulating a SS signal for the QPSK scheme.

Now, various embodiments of the present invention will hereinafter be described with reference to FIGS. 1–11.

(First Embodiment)

Figure 2:
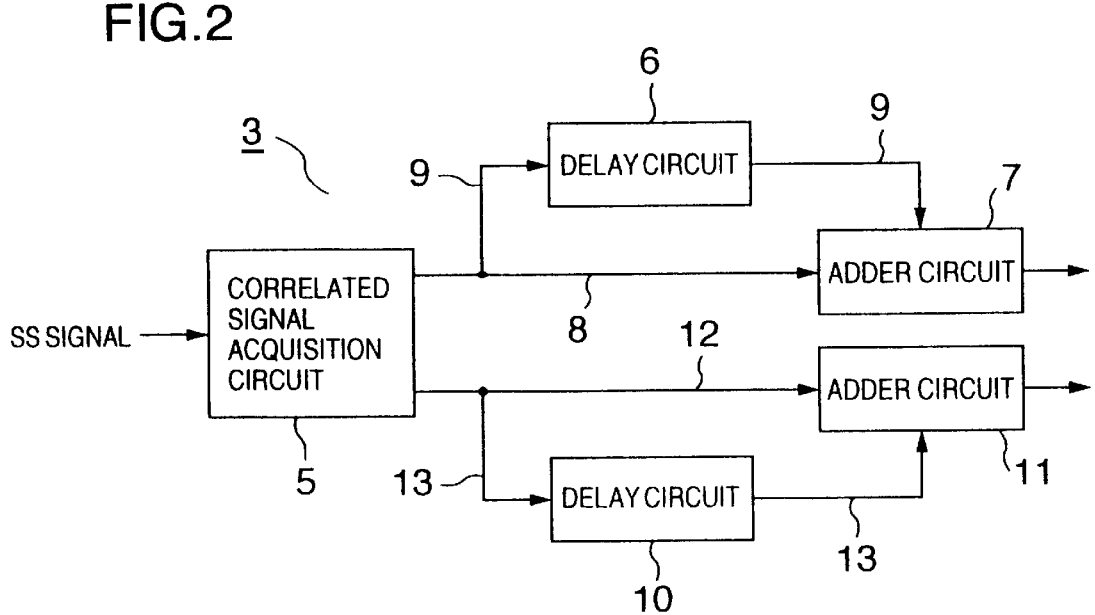
FIG. 2 is a block diagram illustrating a SS demodulator forming a part of the spread spectrum communication apparatus of FIG. 1.

FIG. 1 is a block diagram illustrating a spread spectrum communication apparatus according to a first embodiment of the present invention, and FIG. 2 is a block diagram illustrating a SS demodulator forming a part of the spread spectrum communication apparatus of FIG. 1.

Referring specifically to FIG. 1, the spread spectrum communication apparatus comprises a SS modulator 1 for converting data to be transmitted into a SS signal using a predetermined code sequence; a transmission/reception frequency convertor 2 for converting the frequencies of the SS signal, a signal to be transmitted, and a received signal; a SS demodulator 3 for demodulating a SS signal transmitted thereto to original data; and an antenna 4 for transmitting and receiving signals. While the foregoing configuration has been described as having a transmitter/receiver employing a single transmission/reception frequency convertor, the present invention is not limited to this particular circuit configuration. It goes without saying that any problem will never occur when the transmission/reception frequency convertor is divided into two, i.e., one for transmission and the other for reception, when a transmitter and receiver are separated, when a SS demodulator is incorporated in a separated receiver, and so on.

FIG. 2 describes the SS demodulator in FIG. 1 in greater detail. Referring specifically to FIG. 2, the SS demodulator 3 comprises a correlated signal acquisition circuit 5; a delay circuit 6; an adder circuit 7 for adding output signals of the correlated signal acquisition circuit 5 and the delay circuit 6; signal lines 8, 9; a delay circuit 10; an adder circuit 11 for adding output signals of the correlated signal acquisition circuit 5 and the delay circuit 10; and signal lines 12, 13. The delay circuit 6 has a delay amount set to delay an input signal from the delay circuit 6 with respect to an input signal from the correlated signal acquisition circuit 5 by a time period expressed by $T+(+n\pm 5\times a/8)/fc$ (where T represents one period of a received signal to be demodulated; n represents an integer including zero equal to or less than the ratio of a carrier frequency fc of a signal inputted to the correlated signal acquisition circuit 5 to a chip rate, multiplied by two; and a is a value in a range of $\frac{1}{2} \leq a \leq \frac{3}{2}$), at the time these input signals are supplied to the adder circuit 7. Also, the delay circuit 10 has a delay amount set to delay an input signal from the delay circuit 10 with respect to an input signal from the correlated signal acquisition circuit 5 by a time period expressed by $T+(\pm m-5\times a/8)/fc$ (where m represents an integer including zero equal to or less than the ratio of the carrier frequency fc of the signal inputted to the correlated signal acquisition circuit 5 to a chip rate, multiplied by two; and a is a value in a range of $\frac{1}{2} \leq a \leq \frac{3}{2}$), at the time these input signals are supplied to the adder circuit 11. In this way, a simple configuration composed of the correlated signal acquisition circuit 5, the two delay circuits 6, 10 having different delay amounts from each other, and the adder circuits 7, 11 can realize the demodulation of a SS signal in accordance with the QPSK scheme. In this case, preferably, n=0, m=0, and a=1 are satisfied.

The operation of the SS demodulator configured as described above will be discussed in detail with reference to FIGS. 3 and 4.

Figure 3:
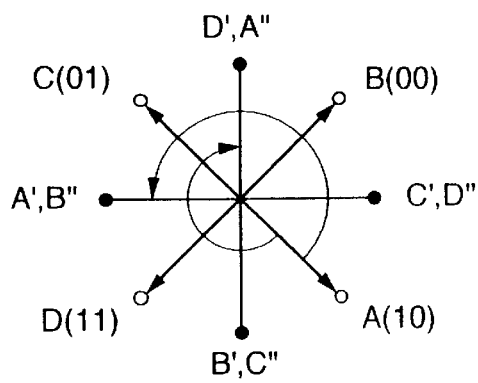
FIG. 3 is a phase state diagram showing phase states of output signals of a surface acoustic wave matched filter and delay circuits when a QPSK signal is demodulated.

FIG. 3 is a phase state diagram showing phase states of output signals of a surface acoustic wave matched filter (i.e., the correlated signal acquisition circuit) and delay circuits when a QPSK signal is demodulated; FIG. 4A is a diagram illustrating a signal sequence of an information signal (original data); FIG. 4B is a diagram illustrating a signal sequence of a signal produced by differential-coding (later described) the information signal of FIG. 4A; FIG. 4C is a waveform diagram illustrating an output signal of the surface acoustic wave matched filter (correlated signal acquisition circuit 5) in the SS demodulator 3; FIG. 4D is a waveform diagram illustrating an output signal of the delay circuit 6 in FIG. 1; FIG. 4E is a waveform diagram illustrating an output signal of the adder circuit 7; FIG. 4F is a waveform diagram illustrating an output signal of the delay circuit 10; FIG. 4G is a waveform diagram illustrating an output signal of the adder circuit 11; and FIG. 4H is a diagram illustrating a signal sequence of a demodulated information signal (original data).

Referring first to FIG. 3, (A, B, C, D) indicates four phase states corresponding to the QPSK scheme in an output signal of the surface acoustic wave matched filter, i.e., A(10), B(00), C(01), and D(11). Assuming herein that a=1, (A', B', C', D') indicates the phase state of a signal delayed by a time period T+($\pm$n+$\frac{5}{8}$)/fc by the delay circuit 6, while (A", B", C", D") indicates the phase state of a signal delayed by a time period T+($\pm$m-$\frac{5}{8}$)/fc by the delay circuit 10. Examining the state A as an example, the state A transitions to the state A' when delayed by the time T+($\pm$n+$\frac{5}{8}$)/fc by the delay circuit 6, and transitions to a state A" when delayed by a time T+($\pm$m-$\frac{5}{8}$)/fc by the delay circuit 10.

Referring next to FIGS. 4A–4H, D1 of FIG. 4A illustrates an information signal to be transmitted; D2 of FIG. 4B illustrates a signal produced by differential-coding the information signal; S1 of FIG. 4C illustrates the waveform of the output signal of the correlated signal acquisition circuit 5; S2 of FIG. 4D illustrates the output waveform of the signal delayed by T+($\pm$n+$\frac{5}{8}$)/f c by the delay circuit 6; S3 of FIG. 4E is the output waveform of a signal from the adder circuit 7 which adds the output signals of the correlated signal acquisition circuit 5 and the delay circuit 6; S4 of FIG. 4F illustrates the output waveform of the signal delayed by T+($\pm$m-$\frac{5}{8}$)/fc by the delay circuit 10; S5 of FIG. 4G is the output waveform of a signal from the adder circuit 11 which adds the output signals of the correlated signal acquisition circuit 5 and the delay circuit 10; and D3 of FIG. 4H illustrates an information signal demodulated from the data S3, S5. It can be seen that the information signal D3 is reproduced to the same data as the original information signal D1.

The first embodiment is described in connection with an information to be transmitted which is differential-coded on the transmission side. When an information to be transmitted (10000111011110: iterative data of phase information ABCDCDA) is differential-coded (D2(i)=D1(i)+D2(i-1)), (10100011100100:AABDACB, for example) is produced, so that the output signal of the correlated signal acquisition circuit 5 in the SS demodulator 3 is the output waveform S1 which has phase information corresponding to the differential-coded information. When the output waveform S1 and the output waveform S2 having phase information (B' A' A' B' D' A' C') delayed by the delay circuit 6 by the time period T+($\pm$n+$\frac{5}{8}$)/fc are added in the adder circuit 7, a large added waveform is produced when phase information of the output waveform S1 is added to phase information of the output waveform S2 with a phase difference of $\pm$45 degrees (for example, when phase information A of the output waveform S1 is added to phase information B', C' of the output waveform S2), while a small added waveform is produced when phase information of the output waveform S1 is added to phase information of the output waveform S2 with a phase difference of $\pm$225 degrees (for example, when phase information A of the output waveform S1 is added to phase information A', D' of the output waveform S2), thus resulting in the waveform S3. When the correlation waveform S1 is added to the output waveform S4 having phase information (B" A" A" B" D" A" C') delayed by the delay circuit 10 by a time T+($\pm$m-$\frac{5}{8}$)/fc in the adder circuit 11, a large added wave is produced when phase information of the output waveform S1 is added to phase information of the output waveform S4 with a phase difference of $\pm$45 degrees (for example, when phase information A of the output waveform S1 is added to phase information C", D" of the output waveform S4), while a small added waveform is produced when phase information of the output waveform S1 is added to phase information of the output waveform S4 with a phase difference of $\pm$225 degrees (for example, when phase information A of the output waveform S1 is added to phase information A", B" of the output waveform S4), thus resulting in the waveform S5. Then, a clock is created from the waveforms S3, S5. When a larger portion of the waveforms S3, S5 is designated by "1" and a smaller portion of the same by "0", demodulated data D3 (10000111011110) is produced, thereby making it possible to demodulate a QPSK signal to original data. Stated another way, the difference in delay amount between the delay circuit 6 and the delay circuit 10 is calculated as $\{T+(\pm n+\frac{5}{8})/fc\}-\{T+(\pm m-\frac{5}{8})/fc\}=(\pm(n+m)+1)/fc+\frac{1}{4}/fc$. Since the first term of the right side is equivalent to 2n in terms of phase, only the second term needs to be taken into consideration. Thus, a phase difference of 90 degrees is produced, thereby making it possible to realize the demodulation in accordance with the QPSK scheme.

While the first embodiment has been described in connection with the operation for demodulating the information D1 which has been differential-coded on the transmission side before transmission, the information D1 to be transmitted may be transmitted as it is. In this case, the demodulated information D3 produced by the SS demodulator may be differential-coded to recover the same information as D1.

For the delay circuits employed in the present embodiment, surface acoustic wave delay lines or electronic circuits such as shift registers may be used in a manner similar to the prior art example. Particularly important in this embodiment is the amounts of delays provided by the associated delay circuits when signals outputted therefrom are supplied to the adder circuit 7 and to the adder circuit 11, respectively. Thus, the implementation of the delay circuits is not of particular importance.

While the first embodiment employs a single correlated signal acquisition circuit 5, a separate correlated signal acquisition circuit may be provided for each delay circuit. Also, amplifiers may be provided before and/or after each delay circuit, if necessary, depending on the selection of a delay circuit.

Figure 5A:
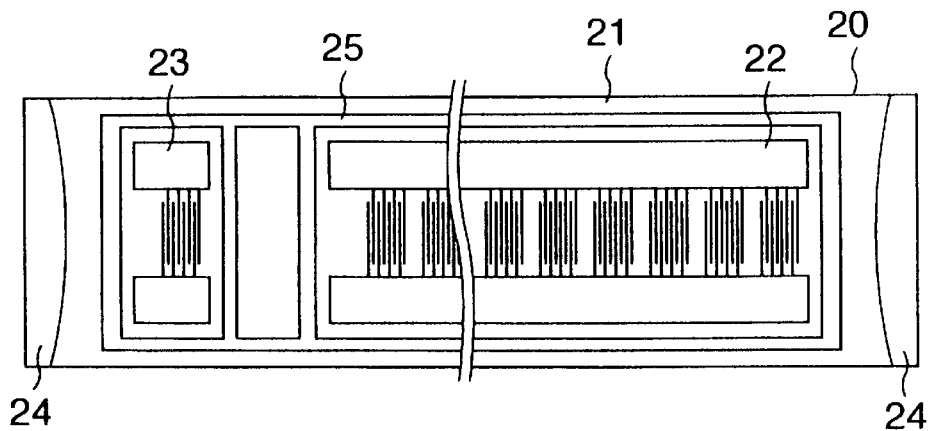
FIG. 5A is a pattern diagram illustrating a surface acoustic wave matched filter used in the first embodiment of the present invention.
Figure 5B:
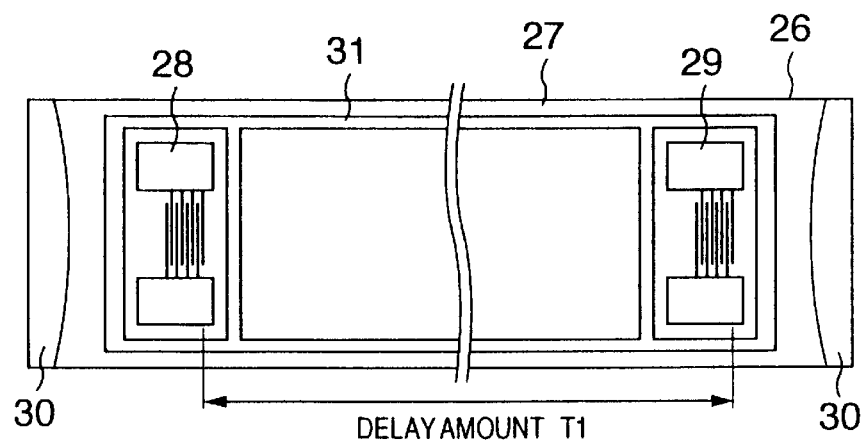
FIG. 5B is a pattern diagram illustrating a surface acoustic wave delay line used in the first embodiment of the present invention.
Figure 5C:
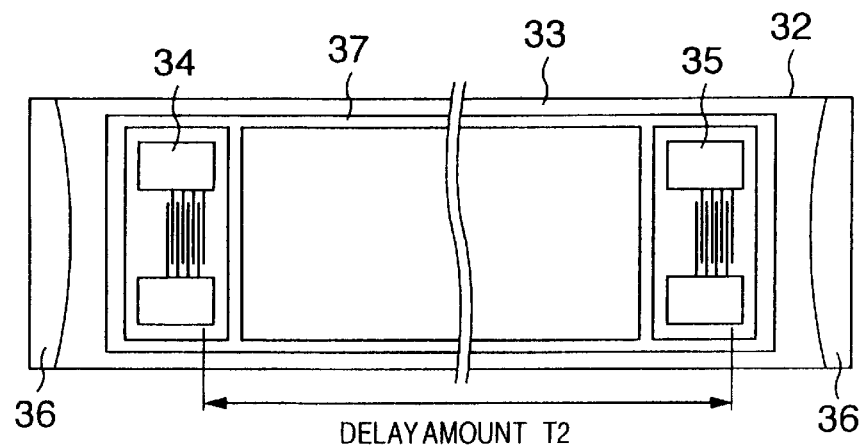
FIG. 5C is a pattern diagram illustrating a surface acoustic wave delay line used in the first embodiment of the present invention.

Next, a surface acoustic wave matched filter and surface acoustic wave delay lines employed in the correlated signal acquisition circuit 5, the delay circuit 6, and the delay circuit 10 will be described in detail with reference to FIGS. 5A–5C. FIG. 5A is a pattern diagram illustrating a surface acoustic wave matched filter used in the embodiment of the present invention, and FIGS. 5B, 5C are pattern diagrams illustrating surface acoustic wave delay lines also employed in the embodiment of the present invention. Referring specifically to FIG. 5A, the illustrated surface acoustic wave matched filter comprises a piezo-electric substrate 21 made of quartz and having a mirror-polished surface; an input coding electrode 22 made of a material having a small electric resistivity such as Al, Au, or the like, and formed on the piezo-electric substrate 21 using the photolythographic technology; an output comb-shaped electrode 23 made of a material having a small electric resistivity such as Al, Au, or the like, and formed in a manner similar to and at a predetermined interval from the input coding electrode 22; an acoustic absorbing material 24 formed outside the input and output electrodes as required for purposes of absorbing unnecessary surface acoustic waves; and an earth pattern 25 formed to surround the input and output electrodes as required for reducing electro-magnetically induced noise.

The surface acoustic wave matched filter 20 is formed in the configuration described above. In this configuration, the number of comb-shaped electrode pairs corresponding to respective codes of the input coding electrode 22 is larger than one. Then, the number of pairs is selected to be equal to or smaller than the ratio of a used carrier frequency to a frequency determined by an interval between the comb-shaped electrode pairs corresponding to the respective codes of the input coding electrode 22, i.e., a chip rate (carrier frequency/chip rate), i.e., 1<the number of comb-shaped electrode pairs≦carrier frequency/chip rate, thereby making it possible to improve the efficiency of the input coding electrode 22 for transducing input signals into surface acoustic waves and therefore to improve the output efficiency in the output comb-shaped electrode 23. Particularly, while the quartz substrate is suitable to the surface acoustic wave matched filter because the temperature coefficient of SAW is zero, its electro-mechanical coupling coefficient is extremely small, specifically, on the order of 0.17%. Thus, an increased number of the comb-shaped electrode pairs corresponding to the respective codes of the coding electrode is effective in enhancing the electromechanical coupling. In the present embodiment, the carrier frequency fc is selected to be 132 MHz and the chip rate to be 22 MHz, so that the number of comb-shaped electrode pairs is two or more and six or less. FIG. 5A illustrates a matched filter having four pairs of comb-shaped electrodes. In addition, the shapes of the electrodes for the input electrode and the output electrode may be exchanged. Specifically, while the coding electrode is used for input and the comb-shaped electrode is used for output in the foregoing embodiment, the comb-shaped electrode may be used for input and the coding electrode for output.

Referring next to FIG. 5B, a surface acoustic wave delay line, generally designated by reference numeral 26, comprises a piezo-electric substrate 27 made of quartz and having a mirror-polished surface; an input comb-shaped electrode 28 made of a material having a small electric resistivity such as Al, Au, or the like, and formed on the piezo-electric substrate 27 using the photolythographic technology; an output comb-shaped electrode 29 made of a material having a small electric resistivity such as Al, Au, or the like and formed in a manner similar to and at a predetermined interval from the input comb-shaped electrode 28; an acoustic absorbing material 30 formed outside the input and output electrodes as required for purposes of absorbing unnecessary surface acoustic waves; and an earth pattern 31 formed to surround the input and output electrodes as required for reducing electro-magnetically induced noise. The surface acoustic wave delay line 26 is formed in the foregoing configuration as a first delay circuit.

Referring next to FIG. 5C, a surface acoustic wave delay line, generally designated by reference numeral 32, comprises a piezo-electric substrate 33 made of quartz and having a mirror-polished surface; an input comb-shaped electrode 34 made of a material having a small electric resistivity such as Al, Au, or the like, and formed on the piezo-electric substrate 33 using the photolythographic technology; an output comb-shaped electrode 35 made of a material having a small electric resistivity such as Al, Au, or the like and formed in a manner similar to and at a predetermined interval from the input comb-shaped electrode 34; an acoustic absorbing material 36 formed outside the input and output electrodes as required for purposes of absorbing unnecessary surface acoustic waves; and an earth pattern 37 formed to surround the input and output electrodes as required for reducing electro-magnetically induced noise. The surface acoustic wave delay line 32 is formed in the foregoing configuration as a second delay circuit.

In this regard, it should be noted that delay amounts provided by the surface acoustic wave delay lines 26, 32 depend on the lengths of signal lines (patterns) 8, 9, 12, 13 and circuit parts used on a circuit board on which the delay lines are actually mounted. Specifically, a delay amount T1 of the surface acoustic wave delay line 26 is set to a value so as to delay an input signal from the surface acoustic wave delay line 26 with respect to an input signal from the surface acoustic wave matched filter 20 by a time period expressed by T+(±n+5×a/8)/fc, at the time these input signals are supplied to the associated adder circuits. A delay amount T2 of the surface acoustic wave delay line 32 in turn is set to a value so as to delay an input signal from the surface acoustic wave delay line 32 with respect to an input signal from the surface acoustic wave matched filter 20 by a time period expressed by T+(±m−5×a/8)/fc, at the time these input signals are supplied to the associated adder circuits.

It should be noted that while in the present embodiment, normal type electrodes have been employed for the shapes of the electrodes in the surface acoustic wave matched filter and the surface acoustic wave delay lines, any other shapes including a double electrode, a weighted shape, and so on may be employed as required for restricting reflection due to the electrodes and for limiting the bandwidth. Also, while the piezo-electric substrate has been described as being made of quartz, it goes without saying that the substrate may be implemented using any other material having similar performance to quartz.

According to the first embodiment as described above, an output signal of the correlated signal acquisition circuit 5 for acquiring a correlated signal from a SS signal is added to each of two output signals from the respective delay circuit 6 and delay circuit 10 by the adder circuit 7 and the adder circuit 11, respectively, and resulting signal waveforms are discriminated to thereby enable the demodulation in accordance with the QPSK scheme, making it possible to configure a simplified demodulator circuit supporting the QPSK scheme. In other words, an in-phase component of original data is demodulated from a first adder circuit, while a quadrature component of the original data is demodulated from a second adder circuit.

(Second Embodiment)

FIG. 6A is a pattern diagram illustrating a surface acoustic wave device according to a second embodiment of the present invention. In FIG. 6A, the illustrated surface acoustic wave device, generally designated by reference numeral 47, comprises a piezo-electric quartz substrate 40 having a mirror-polished surface; an input coding electrode 41 made of a material having a small electric resistivity such as Al, Au, or the like, and formed on the quartz substrate 40 using photolythographic techniques; an output comb-shaped electrode 42a formed of a parallel connection of a first output comb-shaped electrode 43 formed at a predetermined interval from the input coding electrode 41 and a second output comb-shaped electrode 44a formed at a distance of $T+(\pm n+5\times a/8)/fc$ from the first output comb-shaped electrode 43 (where T represents one period of a received signal to be demodulated; n represents an integer including zero equal to or less than the ratio of a carrier frequency fc of a signal inputted to a surface acoustic wave matched filter to a frequency determined from an interval of comb-shaped electrode pairs corresponding to respective codes of a coding electrode, i.e., a chip rate, multiplied by two; and a is a value in a range of $\frac{1}{2} \leq a \leq \frac{3}{2}$) and having the same polarity as the first output comb-shaped electrode 43; an acoustic absorbing material 45 formed outside the input and output electrodes 41, 42a for purposes of absorbing unnecessary surface acoustic waves; and an earth pattern 46 formed to surround the input and output electrodes 41, 42a for reducing electro-magnetically induced noise. Thus, the surface acoustic wave device 47 is formed of the components 40, 41, 42a, 45, and 46. In the surface acoustic wave device of FIG. 6A, the first output comb-shaped electrode 43 is formed at a predetermined interval from the input coding electrode 41, and the second output comb-shaped electrode 44a having the same polarity as the first output comb-shaped electrode 43 is formed at a distance of $T+(\pm n+5\times a/8)/fc$ from the first output comb-shaped electrode 43, where the first output comb-shaped electrode 43 and the second output comb-shaped electrode 44a are connected in parallel.

FIG. 6B is a pattern diagram illustrating an exemplary modification to the surface acoustic wave device according to the second embodiment of the present invention. In FIG. 6B, since a quartz substrate 40, an input coding electrode 41, a first output comb-shaped electrode 43, an acoustic absorbing material 45, and an earth pattern 46 are similar to those of FIG. 6A, they are designated by the same reference numerals, and explanation thereof will be omitted. The illustrated surface acoustic wave device 48 further comprises an output electrode 42b formed of a parallel connection of the first output comb-shaped electrode 43 formed at a predetermined interval from the input coding electrode 41 and a second output comb-shaped electrode 44b formed at a distance of $T+(\pm m-5\times a/8)/fc$ from the first output comb-shaped electrode 43 (where T represents one period of a received signal to be demodulated; m represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the same polarity as the first output comb-shaped electrode 43. Thus, the surface acoustic wave device 48 is formed of the components 40, 41, 42b, 45, 46. It will be noted from the foregoing that the surface acoustic wave device illustrated in FIG. 6B has substantially a similar configuration to that of FIG. 6A, except that the second output comb-shaped electrode 44b is positioned at a distance of $T+(\pm m-5\times a/8)/fc$ from the first output comb-shaped electrode 43 in the output electrode 42b. In the surface acoustic wave device of FIG. 6B, the first output comb-shaped electrode 43 is formed at a predetermined interval from the input coding electrode 41, and the second output comb-shaped electrode 44b having the same polarity as the first output comb-shaped electrode 43 is formed at a distance of $T+(\pm m-5\times a/8)/fc$ from the first output comb-shaped electrode 43, where the first output comb-shaped electrode 43 and the second comb-shaped electrode 44b are connected in parallel.

The surface acoustic wave devices of FIGS. 6A, 6B correspond to the SS demodulator 3 in FIG. 2. Specifically, the operations of the surface acoustic wave devices of FIGS. 6A, 6B are substantially similar to the operation of the SS demodulator 3 in the first embodiment. However, while in the first embodiment, signals extracted from the correlated signal acquisition circuit 5 and the delay circuits 6, 10 are added by the adder circuits 7, 11, respectively, the configurations illustrated in FIGS. 6A, 6B have the first output comb-shaped electrodes 43 and the second output comb-shaped electrodes 44a, 44b connected in parallel to provide the function of equivalent adder circuits on the substrate. It should be noted however that the SS demodulator illustrated in FIG. 2 has only one correlated signal acquisition circuit 5, whereas the configurations illustrated in FIGS. 6A, 6B differ from the SS demodulator of FIG. 2 in that two surface acoustic wave matched filters are formed corresponding to two surface acoustic wave delay elements.

Similarly to the first embodiment, when the number of comb-shaped electrode pairs corresponding to respective codes of the input coding electrode 41 is selected to be one or more and equal to or less than the ratio of a used carrier frequency to the chip rate, a converting efficiency and hence an output efficiency can be improved. In addition, the input electrode and the output electrode may be exchanged in shape with each other. Specifically, the coding electrode employed for signal input may be used as an output electrode, while the comb-shaped electrode employed for signal output may be used as an input electrode.

Further, since the acoustic absorbing materials 45 in FIGS. 6A, 6B are illustrated merely in an exemplary shape, the acoustic absorbing material 45 may be in any shape as long as it exhibits good characteristics. In addition, the acoustic absorbing material 45 may not have to be formed if it is determined as unnecessary even in consideration of surface acoustic waves.

Furthermore, while the surface acoustic wave devices 47, 48 are shown separately in FIGS. 6A, 6B, they may be formed on the same substrate.

Furthermore, while in the second embodiment, normal type electrodes have been employed for the shapes of the electrodes in the surface acoustic wave matched filter and the surface acoustic wave delay lines, any other shapes including a double electrode, a weighted shape, and so on may be employed as required for restricting reflection due to the electrodes and for limiting the bandwidth. Particularly, when three or more electrodes are formed in a propagating direction of surface acoustic waves as in the second embodiment, the employment of a double electrode structure for the respective electrodes will result in an extremely large effect in suppression of unnecessary radiations, thereby producing an effect on stabilizing the output signal.

Also, while in the second embodiment, the piezo-electric substrate has been described as being made of quartz, it goes without saying that the substrate may be implemented using any other material having similar performance to quartz.

Further, in the second embodiment, the first output comb-shaped electrodes 43 and the second output comb-shaped electrodes 44a, 44b are connected in parallel to form the output electrodes 42a, 42b to provide the function of adder circuits. Alternatively, the output comb-shaped electrodes 43, 44a and 43, 44b may be formed without being connected in parallel if adder circuits are provided external to the surface acoustic wave device. In this case, it will be apparent that output signals may be extracted separately from the respective output comb-shaped electrodes 43, 44a, 44b, and appropriately added by external adder circuits to produce a demodulated signal.

According to the second embodiment as described above, since the first output comb-shaped electrodes 43 and the second output comb-shaped electrodes 44a, 44b are connected in parallel to provide the function of adder circuits on the substrate, the demodulation in accordance with the QPSK scheme is enabled without externally providing adder circuits, thereby making it possible to realize a demodulator circuit which supports the QPSK scheme in a simple configuration.

(Third Embodiment)

FIG. 7A is a pattern diagram illustrating a surface acoustic wave device according to a third embodiment of the present invention. In FIG. 7A, the illustrated surface acoustic wave device, generally designated by reference numeral 57, comprises a piezo-electric quartz substrate 50 having a mirror-polished surface; an input coding electrode 51 made of a material having a small electric resistivity such as Al, Au, or the like, and formed on the quartz substrate 50 using the photolythographic technology; an output comb-shaped electrode 52a formed of a parallel connection of a first output comb-shaped electrode 53 formed at a predetermined interval from the input coding electrode 51 and a second output comb-shaped electrode 54a formed at a distance of T+($\pm$n+a/8)/fc from the first output comb-shaped electrode 53 (where T represents one period of a received signal to be demodulated; n represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the opposite polarity to the first output comb-shaped electrode 53; an acoustic absorbing material 55 formed outside the input and output electrodes 51, 52a for purposes of absorbing unnecessary surface acoustic waves; and an earth pattern 56 formed to surround the input and output electrodes 51, 52a for reducing electro-magnetically induced noise. Thus, the surface acoustic wave device 57 is formed of the components 50, 51, 52a, 55, and 56. In the surface acoustic wave device 57 of FIG. 7A, the first output comb-shaped electrode 53 is formed at a predetermined interval from the input coding electrode 51, and the second output comb-shaped electrode 54a having the opposite polarity to the first output comb-shaped electrode 53 is formed at a distance of T+($\pm$n+a/8)/fc from the first output comb-shaped electrode 53, where the first output comb-shaped electrode 53 and the second output comb-shaped electrode 54a are connected in parallel.

FIG. 7B is a pattern diagram illustrating another surface acoustic wave device according to the third embodiment. In FIG. 7B, since a quartz substrate 50, an input coding electrode 51, a first output comb-shaped electrode 53, an acoustic absorbing material 55, and an earth pattern 56 are similar to those in FIG. 7A, they are designated by the same reference numerals, and explanation thereof is omitted. The illustrated surface acoustic wave device, generally designated by reference numeral 58, further comprises an output comb-shaped electrode 52b formed of a parallel connection of a first output comb-shaped electrode 53 formed at a predetermined interval from the input coding electrode 51 and a second output comb-shaped electrode 54b formed at a distance of T+($\pm$m−a/8)/fc from the first output comb-shaped electrode 53 (where T represents one period of a received signal to be demodulated; m represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the opposite polarity to the first output comb-shaped electrode 53. Thus, the surface acoustic wave device 58 is formed of the components 50, 51, 52b, 55, and 56. As is apparent from the foregoing, the surface acoustic wave device illustrated in FIG. 7B has substantially a similar configuration to that of FIG. 7A except that the second output comb-shaped electrode 54b is positioned at a distance of T+($\pm$m−a/8)/fc from the first output comb-shaped electrode 53 in the output electrode 52b. In the surface acoustic wave device 58 illustrated in FIG. 7B, the first output comb-shaped electrode 53 is formed at a predetermined interval from the input coding electrode 51, while the second output comb-shaped electrode 54b having the opposite polarity to the first output combe-shaped electrode 53 is formed at a distance of T+($\pm$m−a/8)/fc from the first output comb-shaped electrode 53, where the first output comb-shaped electrode 53 and the second output comb-shaped electrode 54b are connected in parallel.

The surface acoustic wave devices of FIGS. 7A, 7B correspond to the SS demodulator 3 in FIG. 2. Specifically, the operations of the surface acoustic wave devices of FIGS. 7A, 7B are substantially similar to that of the first embodiment. However, while in the first embodiment, signals extracted from the correlated signal acquisition circuit 5 and the delay circuits 6, 10 are added by the adder circuits 7, 11, respectively, the configurations illustrated in FIGS. 7A, 7B are such that the first output comb-shaped electrodes 53 and the second output comb-shaped electrodes 54a, 54b are connected in parallel to provide the function of the adder circuits on the substrate. It should be noted however that the SS demodulator illustrated in FIG. 2 has only one correlated signal acquisition circuit 5, whereas the configurations illustrated in FIGS. 7A, 7B differ from the SS demodulator of FIG. 2 in that two surface acoustic wave matched filters are formed corresponding to two surface acoustic wave delay elements. In addition, while the position at which the second output comb-shaped electrode 54a or 54b is formed is different from the position at which the corresponding second output comb-shaped electrode 44a or 44b is formed in the second embodiment, the third embodiment performs the same operation as the second embodiment since the polarity of the second output comb-shaped electrode 54a or 54b is opposite to that of the first output comb-shaped electrode 53.

Similarly to the first embodiment, when the number of comb-shaped electrode pairs corresponding to respective codes of the input coding electrode 51 is selected to be one or more and equal to or less than the ratio of a used carrier frequency to the chip rate, a converting efficiency and hence an output efficiency can be improved. In addition, the input electrode and the output electrode may be exchanged in shape with each other. Specifically, the surface acoustic wave device of the third embodiment may be configured with a comb-shaped electrode used for input and coding electrodes used for output.

Further, since the acoustic absorbing material 55 in FIGS. 7A, 7B are illustrated merely in an exemplary shape, the acoustic absorbing material 55 may be in any shape as long as it exhibits good characteristics. In addition, the acoustic absorbing material 55 may not have to be formed if it is determined as unnecessary even in consideration of surface acoustic waves. Moreover, while the surface acoustic wave devices 57, 58 are shown separately in FIGS. 7A, 7B, they may be formed on the same substrate.

Furthermore, while in the third embodiment, normal type electrodes have been employed for the shapes of the electrodes in the surface acoustic wave matched filters and the surface acoustic wave delay lines, any other shapes including a double electrode, a weighted shape, and so on may be employed as required for restricting reflection due to the electrodes and for limiting the bandwidth. Particularly, when three or more electrodes are formed in a propagating direction of surface acoustic waves as in the third embodiment, the employment of a double electrode structure for the respective electrodes will result in an extremely large effect in suppression of unnecessary radiations, thereby producing an effect on stabilizing the output signal.

Also, while in the third embodiment, the piezo-electric substrate has been described as being made of quartz, it goes without saying that the substrate may be implemented using any other material having similar performance to quartz.

Further, in the third embodiment, the first output comb-shaped electrodes 53 and the second output comb-shaped electrodes 54a, 54b are connected in parallel to form the output electrodes 52a, 52b to provide the function of adder circuits. Alternatively, the output comb-shaped electrodes 53, 54a and 53, 54b may be formed without being connected in parallel if adder circuits are provided external to the surface acoustic wave device. In this case, it will be apparent that output signals may be extracted separately from the respective output comb-shaped electrodes 53, 54a, 54b, and appropriately added by external adder circuits to produce a demodulated signal.

According to the third embodiment as described above, since the first output comb-shaped electrodes 53 and the second output comb-shaped electrodes 54a, 54b are connected in parallel to provide the function of adder circuits on the substrate, the demodulation in accordance with the QPSK scheme is enabled without externally providing adder circuits, thereby making it possible to realize a demodulator circuit which supports the QPSK scheme in a simple configuration.

(Fourth Embodiment)

FIG. 8 is a pattern diagram illustrating a surface acoustic wave device according to a fourth embodiment of the present invention. In FIG. 8, the illustrated surface acoustic wave device, generally designated by reference numeral 67, comprises a piezo-electric quartz substrate 60 having a mirror-polished surface; a first input coding electrode 61a made of a material having a small electric resistivity such as Al, Au, or the like, and formed on the quartz substrate 60 using the photolythographic technology; an output electrode 62a formed of a parallel connection of a first output comb-shaped electrode 63a formed at a predetermined interval from the first input coding electrode 61a and a second output comb-shaped electrode 64a formed at a distance of T+($\pm$n+5$\times$a/8)/fc from the first output comb-shaped electrode 63a (where T represents one period of a received signal to be demodulated; n represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the same polarity as the first output comb-shaped electrode 63a; a second input coding electrode 61b made of a material having a small electric resistivity such as Al, Au, or the like, and formed on the quartz substrate 60 using the photolythographic technology; an output electrode 62b formed of a parallel connection of a third output comb-shaped electrode 63b formed at a predetermined interval from the second input coding electrode 61b and a fourth output comb-shaped electrode 64b formed at a distance of T+($\pm$m−5$\times$a/8)/fc from the third output comb-shaped electrode 63b (where T represents one period of a received signal to be demodulated; m represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the same polarity as the third output comb-shaped electrode 63b; an earth pattern 65 formed to surround the input and output electrodes for reducing electromagnetically induced noise; and an acoustic absorbing material 66 formed outside the input and output electrodes 61a, 61b, 62a, 62b for purposes of absorbing unnecessary surface acoustic waves. Thus, the surface acoustic wave device 67 is formed of the components 60, 61a, 61b, 62a, 62b, 65, and 66.

The surface acoustic wave device of FIG. 8 corresponds to the SS demodulator 3 in FIG. 2, and performs the same operation as the second embodiment. It should be noted however that the fourth embodiment differs from the second embodiment in that ground terminals of the input coding electrodes, ground terminals of the output electrodes, and the earth pattern are connected in common. By thus configuring the surface acoustic wave device, it is possible to reduce the substrate area as compared with that required for separately forming the respective patterns of electrodes as well as to reduce the number of wire bonding and accordingly the number of process steps during assembly, thereby achieving a reduction in size and cost of the device.

Similarly to the first embodiment, when the numbers of comb-shaped electrode pairs corresponding to respective codes of the input coding electrodes 61a, 61b are selected to be one or more and equal to or less than the ratio of a used carrier frequency to the chip rate, a converting efficiency and hence an output efficiency can be improved. In addition, the input electrode and the output electrode may be exchanged in shape with each other. Specifically, the surface acoustic wave device of the fourth embodiment may be configured with comb-shaped electrodes used for input and coding electrodes used for output.

Further, since the acoustic absorbing material 66 in FIG. 8 is merely illustrated in an exemplary shape, the acoustic absorbing material 66 may be in any shape as long as it exhibits good characteristics. In addition, the acoustic absorbing material 66 may not have to be formed if it is determined as unnecessary even in consideration of surface acoustic waves.

Furthermore, while in the fourth embodiment, normal type electrodes have been employed for the shapes of the electrodes in the surface acoustic wave matched filters and the surface acoustic wave delay lines, any other shapes including a double electrode, a weighted shape, and so on may be employed as required for restricting reflection due to the electrodes and for limiting the bandwidth. Particularly, when three or more electrodes are formed in a propagating direction of surface acoustic waves as in the fourth embodiment, the employment of a double electrode structure for the respective electrodes will result in an extremely large effect in suppression of unnecessary radiations, thereby producing an effect on stabilizing the output signal.

Also, while in the fourth embodiment, the piezo-electric substrate has been described as being made of quartz, it goes without saying that the substrate may be implemented using any other material having similar performance to quartz.

Further, the fourth embodiment may be applied to the surface acoustic wave device having the shape described in the third embodiment.

Further, in the fourth embodiment, the first output comb-shaped electrode 63a and the second output comb-shaped electrodes 64a, and the third output comb-shaped electrode 63b and the fourth output comb-shaped electrode 64b are connected in parallel to form the output electrodes 62a, 62b, respectively, to provide the function of adder circuits. Alternatively, the output comb-shaped electrodes 63a, 64a and 63b, 64b may be formed without being connected in parallel if adder circuits are provided external to the surface acoustic wave device. In this case, it will be apparent that output signals may be extracted separately from the respective output comb-shaped electrodes 63a, 64a, 63b, 64b, and appropriately added by external adder circuits to produce a demodulated signal.

According to the fourth embodiment as described above, since the first output comb-shaped electrode 63a and the second output comb-shaped electrode 64a, and the third output comb-shaped electrode 63b and the fourth output comb-shaped electrode 64b are connected in parallel to form the output electrodes 62a, 62b, respectively, to provide the function of adder circuits on the substrate, the demodulation in accordance with the QPSK scheme is enabled without externally providing adder circuits. In addition, since two surface acoustic wave matched filters and two surface acoustic wave delay lines are formed on the same substrate, the surface acoustic wave device can be reduced in size, thereby making it possible to configure a simple and compact demodulator circuit which supports the QPSK scheme.

(Fifth Embodiment)

Figure 9:
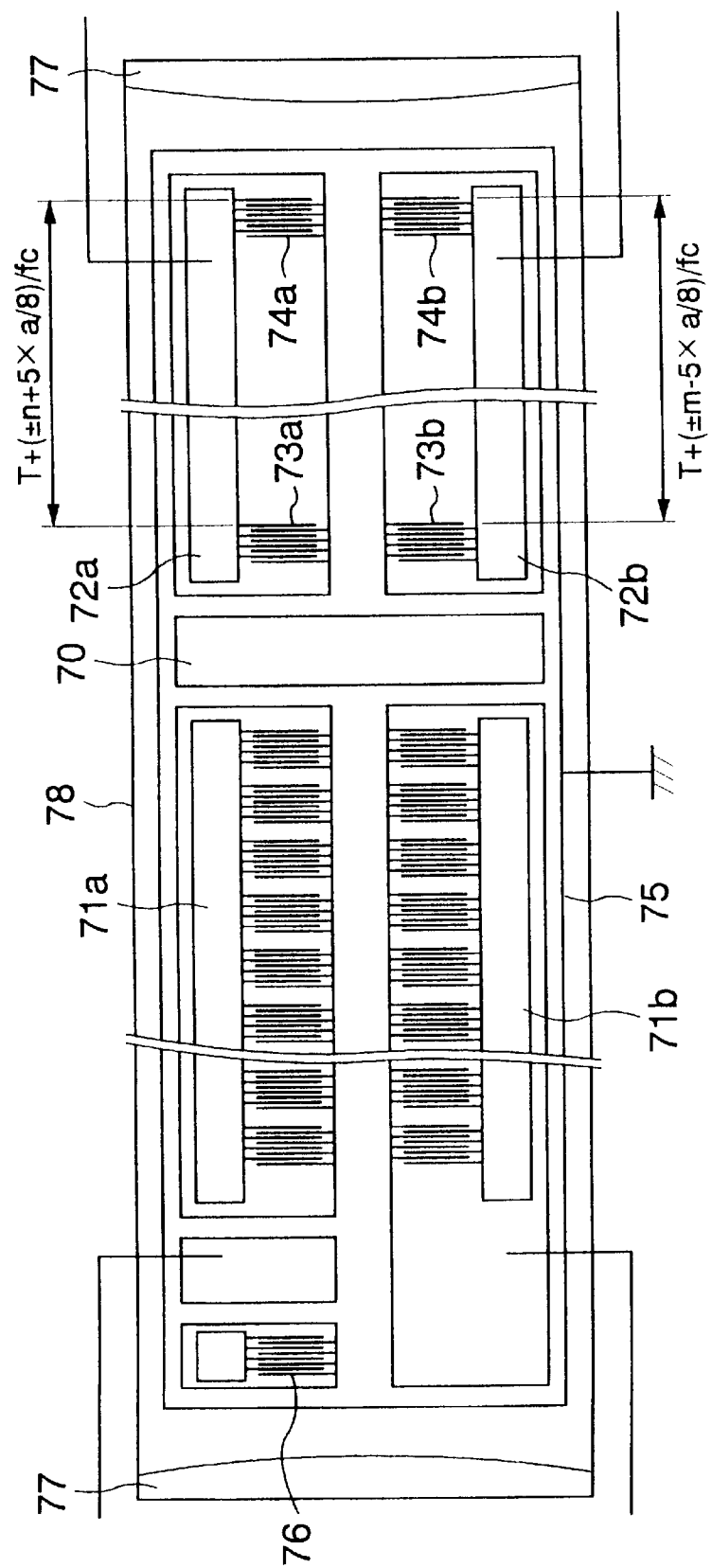
FIG. 9 is a pattern diagram illustrating a surface acoustic wave device according to a fifth embodiment of the present invention.

FIG. 9 is a pattern diagram illustrating a surface acoustic wave device according to a fifth embodiment of the present invention. In FIG. 9, the illustrated surface acoustic wave device, generally designated by reference numeral 78, comprises a piezo-electric quartz substrate 70 having a mirror-polished surface; a first input coding electrode 71a made of a material having a small electric resistivity such as Al, Au, or the like, and formed on the quartz substrate 70 using the photolythographic technology; an output electrode 72a formed of a parallel connection of a first output comb-shaped electrode 73a formed at a predetermined interval from the first input coding electrode 71a and a second output comb-shaped electrode 74a formed at a distance of T+(±n+5×a/8)/fc from the first output comb-shaped electrode 73a (where T represents one period of a received signal to be demodulated; n represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of ½≦a≦¾) and having he same polarity as the first output comb-shaped electrode 73a; a second input coding electrode 71b made of a material having a small electric resistivity such as Al, Au, or the like, and formed on the quartz substrate 70 using the photolythographic technology; an output electrode 72b formed of a parallel connection of a third output comb-shaped electrode 73b formed at a predetermined interval from the second input coding electrode 71b and a fourth output comb-shaped electrode 74b formed at a distance of T+(±m−5×a/8)/fc from the third output comb-shaped electrode 73b (where T represents one period of a received signal to be demodulated; m represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of ½≦a≦¾) and having the same polarity as the third output comb-shaped electrode 73b; an earth pattern 75 formed to surround the input and output electrodes for reducing electromagnetically induced noise; an output comb-shaped electrode 76 for outputting a clock signal formed at a predetermined distance from the first input coding electrode 71a; and an acoustic absorbing material 77 formed outside the input and output electrodes 71b, 72a, 72b, 76 for purposes of absorbing unnecessary surface acoustic waves. Thus, the surface acoustic wave device 78 is formed of the components 70, 71a, 71b, 72a, 72b, 75, 76, and 77. The surface acoustic wave device of FIG. 9 corresponds to the SS demodulator 3 in FIG. 2, and performs the same operation and produces the same effect as the fourth embodiment. It should be noted however that the fifth embodiment differs from the fourth embodiment in that the output comb-shaped electrode 76 for a clock signal is additionally included so that a clock signal can be stably provided.

Similarly to the first embodiment, when the numbers of comb-shaped electrode pairs corresponding to respective codes of the input coding electrodes 71a, 71b are selected to be one or more and equal to or less than the ratio of a used carrier frequency to the chip rate, a converting efficiency and hence an output efficiency can be improved. In addition, the input electrode and the output electrode may be exchanged in shape with each other. Specifically, the surface acoustic wave device of the fifth embodiment may be configured with comb-shaped electrodes used for input and coding electrodes used for output. In the fifth embodiment, the output comb-shape electrode 76 for a clock signal is formed opposite to the output comb-shaped electrodes 72a, 72b with respect to the input coding electrode 71. However, the output comb-shape electrode 76 is not limited to any particular forming position and size, and it may be positioned at any other place, for example, between the input coding electrode 71a and the output electrode 72a, and so on.

Further, since the acoustic absorbing material 77 in FIG. 9 is merely illustrated in an exemplary shape, the acoustic absorbing material 77 may be in any shape as long as it exhibits good characteristics. In addition, the acoustic absorbing material 77 may not have to be formed if it is determined as unnecessary even in consideration of surface acoustic waves.

Furthermore, while in the fifth embodiment, normal type electrodes have been employed for the shapes of the electrodes in the surface acoustic wave matched filters and the surface acoustic wave delay lines, any other shapes including a double electrode, a weighted shape, and so on may be employed as required for restricting reflection due to the electrodes and for limiting the bandwidth. Particularly, when three or more electrodes are formed in a propagating direction of surface acoustic waves as in the fifth embodiment, the employment of a double electrode structure for the respective electrodes will result in an extremely large effect in suppression of unnecessary radiations, thereby producing an effect on stabilizing the output signal.

Also, while in the fifth embodiment, the piezo-electric substrate has been described as being made of quartz, it goes without saying that the substrate may be implemented using any other material having similar performance to quartz.

Further, the fifth embodiment may be applied to the surface acoustic wave device having the shape described in the third embodiment.

Further, in the fifth embodiment, the first output comb-shaped electrode 73*a* and the second output comb-shaped electrode 74*a*, and the third output comb-shaped electrode 73*b* and the fourth output comb-shaped electrode 74*b* are connected in parallel to form the output electrodes 72*a*, 72*b*, respectively, to provide the function of adder circuits. Alternatively, the output comb-shaped electrodes 73*a*, 74*a* and 73*b*, 74*b* may be formed without being connected in parallel if adder circuits are provided external to the surface acoustic wave device. In this case, it will be apparent that output signals may be extracted separately from the respective output comb-shaped electrodes 73*a*, 74*a*, 73*b*, 74*b*, and appropriately added by external adder circuits to produce a demodulated signal.

According to the fifth embodiment as described above, since the first output comb-shaped electrode 73*a* and the second output comb-shaped electrode 74*a*, and the third output comb-shaped electrode 73*b* and the fourth output comb-shaped electrode 74*b* are connected in parallel to form the output electrodes 72*a*, 72*b*, respectively, to provide the function of adder circuits on the substrate, the demodulation in accordance with the QPSK scheme is enabled without externally providing adder circuits. In addition, since two surface acoustic wave matched filters and two surface acoustic wave delay lines are formed on the same substrate, the surface acoustic wave device can be reduced in size, thereby making it possible to configure a simple and compact demodulator circuit which supports the QPSK scheme.

(Sixth Embodiment)

Figure 10:
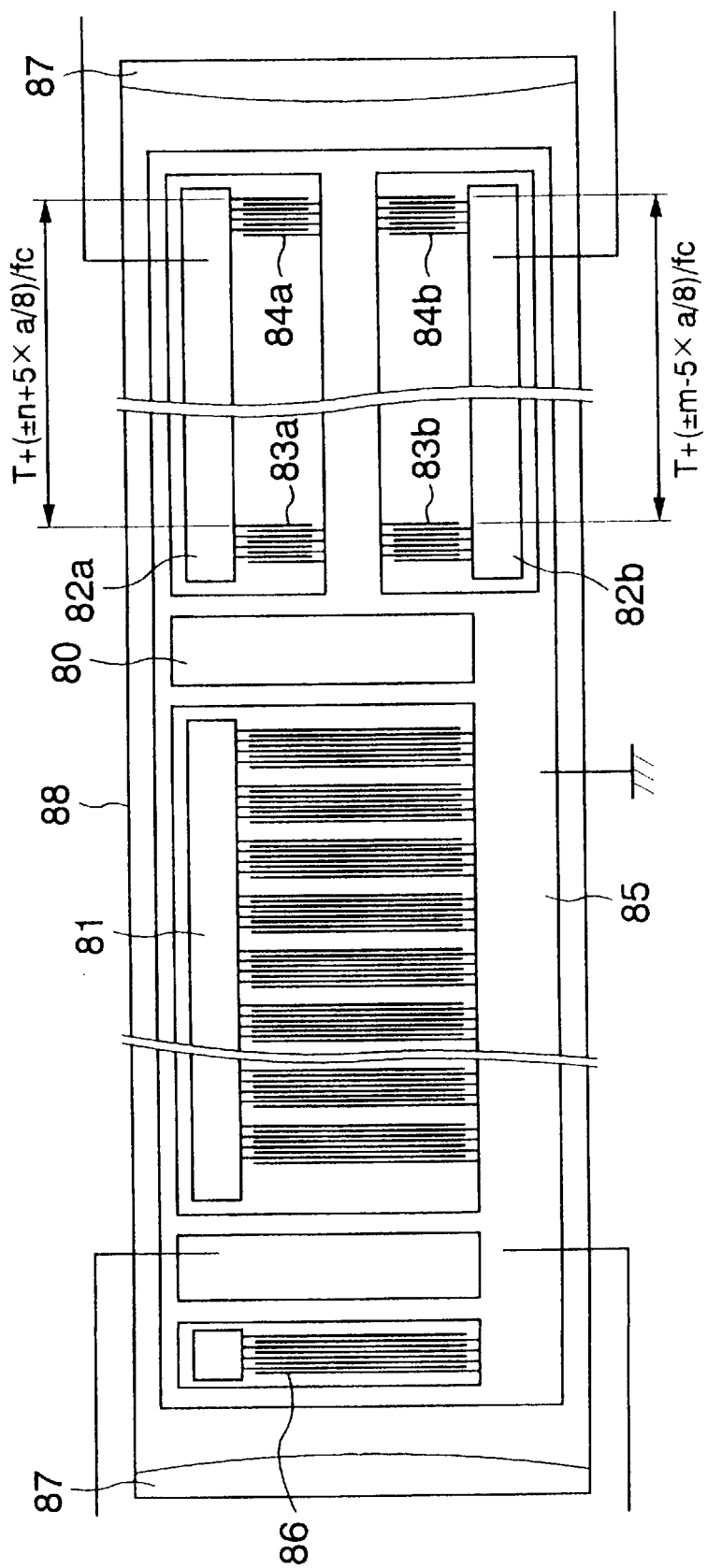
FIG. 10 is a pattern diagram illustrating a surface acoustic wave device according to a sixth embodiment of the present invention.

FIG. 10 is a pattern diagram illustrating a surface acoustic wave device according to a sixth embodiment of the present invention. In FIG. 10, the illustrated surface acoustic wave device, generally designated by reference numeral 88, comprises a piezo-electric quartz substrate 80 having a mirror-polished surface; an input coding electrode 81 made of a material having a small electric resistivity such as Al, Au, or the like, and formed on the quartz substrate 80 using the photolythographic technology; an output electrode 82*a* formed of a parallel connection of a first output comb-shaped electrode 83*a* formed at a predetermined interval from the input coding electrode 81 and a second output comb-shaped electrode 84*a* formed at a distance of T+($\pm$n+5×a/8)/fc from the first output comb-shaped electrode 83*a* (where T represents one period of a received signal to be demodulated; n represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the same polarity as the first output comb-shaped electrode 83*a*; an output electrode 82*b* formed of a parallel connection of a third output comb-shaped electrode 83*b* formed at a predetermined interval from the input coding electrode 81 and a fourth output comb-shaped electrode 84*b* formed at a distance of T+($\pm$m−5×a/8)/fc from the third output comb-shaped electrode 83*b* (where T represents one period of a received signal to be demodulated; m represents an integer including zero equal to or less than the ratio of a carrier frequency fc of a signal inputted to a surface acoustic wave matched filter to a frequency determined from an interval of comb-shaped electrode pairs corresponding to respective codes of the coding electrode, i.e., a chip rate, multiplied by two; and a is a value in a range of $\frac{1}{2} \leq a \leq \frac{3}{2}$) and having the same polarity as the third output comb-shaped electrode 83*b*; an earth pattern 85 formed to surround the input electrode and the output electrodes for reducing electromagnetically induced noise; an output comb-shaped electrode 86 for outputting a clock signal formed at a predetermined interval from the input coding electrode 81; and an acoustic absorbing material 87 formed outside the output electrodes 82*a*, 82*b*, 86 for purposes of absorbing unnecessary surface acoustic waves. Thus, the surface acoustic wave device 88 is formed of the components 80, 81, 82*a*, 82*b*, 85, 86, and 87.

The surface acoustic wave device of FIG. 10 corresponds to the SS demodulator 3 in FIG. 2, and performs the same operation and produces the same effect as the fifth embodiment. It should be noted however that the sixth embodiment differs from the fifth embodiment in that two input coding electrodes are integrally formed so that the number of input terminals can be reduced.

Similarly to the first embodiment, when the number of comb-shaped electrode pairs corresponding to respective codes of the input coding electrode 81 is selected to be one or more and equal to or less than the ratio of a used carrier frequency to the chip rate, a converting efficiency and hence an output efficiency can be improved. In addition, the input electrode and the output electrode may be exchanged in shape with each other. Specifically, the surface acoustic wave device of the sixth embodiment may be configured with a comb-shaped electrode used for input and coding electrodes used for output.

In the sixth embodiment, the output comb-shape electrode 86 for a clock signal is formed opposite to the output comb-shaped electrodes 82*a*, 82*b* with respect to the input coding electrode 81. However, the output comb-shape electrode 86 is not limited to any particular forming position and size, and it may be positioned at any other place, for example, between the input coding electrode 81 and the output electrodes 82*a*, 82*b*, and so on.

Further, since the acoustic absorbing material 87 in FIG. 10 is merely illustrated in an exemplary shape, the acoustic absorbing material 87 may be in any shape as long as it exhibits good characteristics. In addition, the acoustic absorbing material 87 may not have to be formed if it is determined as unnecessary even in consideration of surface acoustic waves.

Furthermore, while in the sixth embodiment, normal type electrodes have been employed for the shapes of the electrodes in the surface acoustic wave matched filters and the surface acoustic wave delay lines, any other shapes including a double electrode, a weighted shape, and so on may be employed as required for restricting reflection due to the electrodes and for limiting the bandwidth. Particularly, when three or more electrodes are formed in a propagating direction of surface acoustic waves as in the sixth embodiment, the employment of a double electrode structure for the respective electrodes will result in an extremely large effect in suppression of unnecessary radiations, thereby producing an effect on stabilizing the output signal.

Also, while in the sixth embodiment, the piezo-electric substrate has been described as being made of quartz, it goes without saying that the substrate may be implemented using any other material having similar performance to quartz.

Further, the sixth embodiment may be applied to the surface acoustic wave devices having the shapes described in the third and fourth embodiments.

Further, in the sixth embodiment, the first output comb-shaped electrode 83a and the second output comb-shaped electrodes 84a, and the third output comb-shaped electrode 83b and the fourth output comb-shaped electrode 84b are connected in parallel to form the output electrodes 82a, 82b, respectively, to provide the function of adder circuits. Alternatively, the output comb-shaped electrodes 83a, 84a and 83b, 84b may be formed without being connected in parallel if adder circuits are provided external to the surface acoustic wave device. In this case, it will be apparent that output signals may be extracted separately from the respective output comb-shaped electrodes 83a, 84a, 83b, 84b, and appropriately added by external adder circuits to produce a demodulated signal.

According to the sixth embodiment as described above, since the first output comb-shaped electrode 83a and the second output comb-shaped electrode 84a, and the third output comb-shaped electrode 83b and the fourth output comb-shaped electrode 84b are connected in parallel to form the output electrodes 82a, 82b, respectively, to provide the function of adder circuits on the substrate, the demodulation in accordance with the QPSK scheme is enabled without externally providing adder circuits. In addition, since two surface acoustic wave matched filters and two surface acoustic wave delay lines are formed on the same substrate, the surface acoustic wave device can be reduced in size, thereby making it possible to configure a simple and compact demodulator circuit which supports the QPSK scheme.

(Seventh Embodiment)

Figure 11:
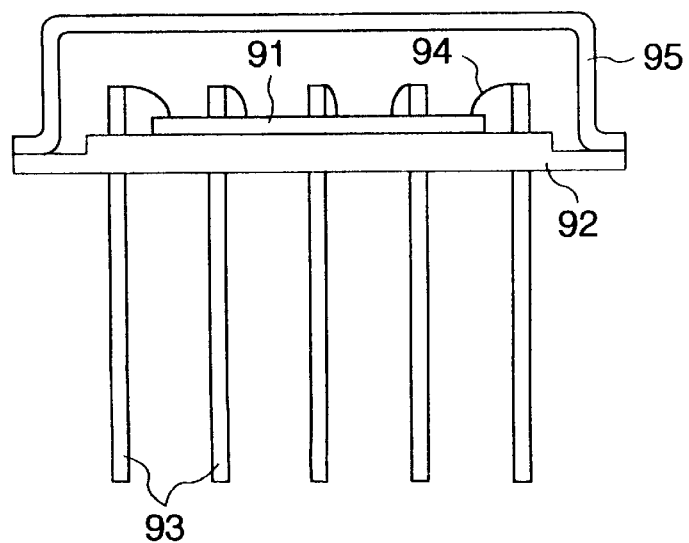
FIG. 11 is a pattern diagram illustrating a surface acoustic wave part according to a seventh embodiment of the present invention.
Figure 12:
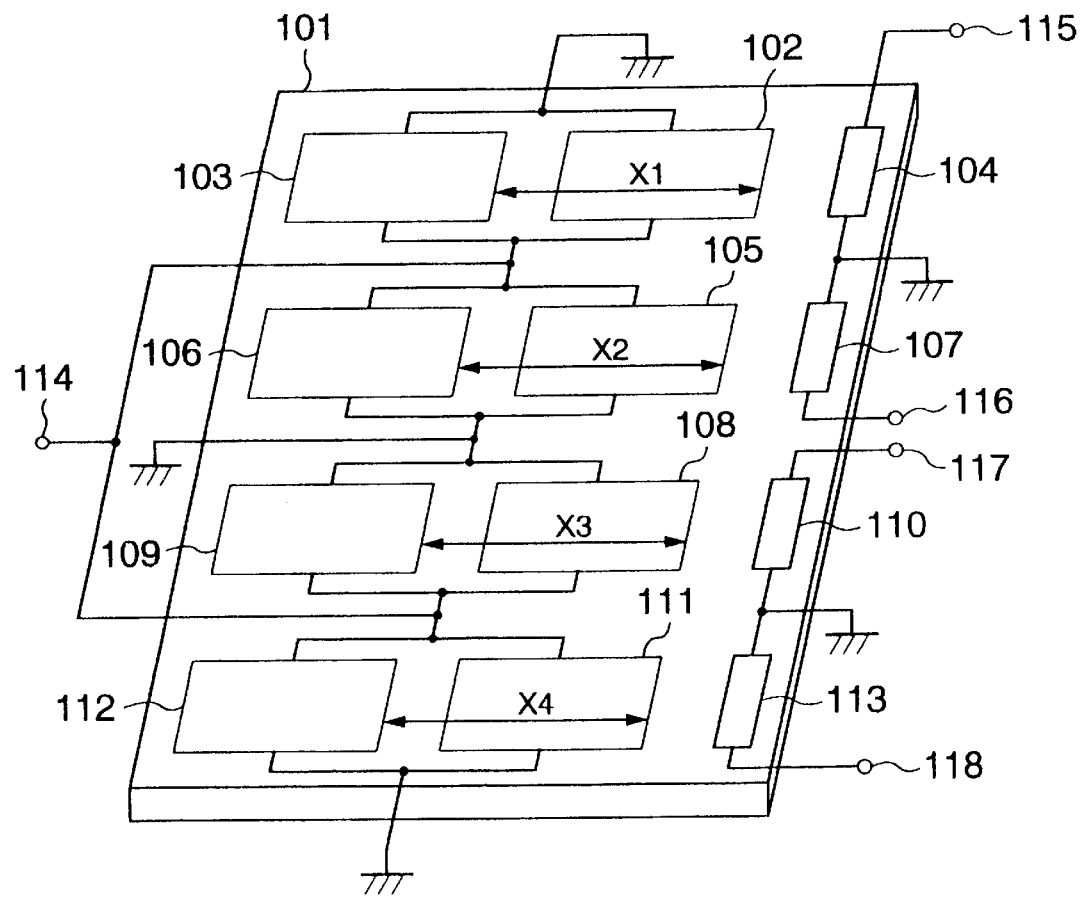
FIG. 12 is a schematic diagram illustrating a surface acoustic wave matched filter used in a conventional demodulator.

FIG. 11 is a cross-sectional view illustrating a surface acoustic wave part according to a seventh embodiment of the present invention. Referring specifically to FIG. 11, the surface acoustic wave part comprises a surface acoustic wave device 91; a base 92 of a package for securely holding and air-tight sealing the surface acoustic wave device 91; lead pins 93 attached to the base 92 in connection to input and output terminals and a ground terminal of the surface acoustic wave device 91 for leading out these terminals outside the package, where the number of the lead pins corresponds to the number of terminals to be connected; wires 94 made of Au, Al, or the like for connecting respective terminals of the surface acoustic wave device 91 with the lead pins 93; and a cap 95 welded to the base 92 for air-tight sealing the surface acoustic wave device 91. Nitrogen gas or inert gas is filled in the package when the surface acoustic wave device 91 is air-tight sealed therein.

Since the configuration as mentioned above isolates the surface acoustic wave device 91 from the external environment, it is possible to eliminate inconveniences such as variations in the propagation speed of surface acoustic waves, unwanted reflection, short-circuiting of comb-shaped electrodes, and so on which would otherwise be caused by foreign substances attached on the surface of the device.

When the surface acoustic wave device according to any of the foregoing second—sixth embodiments is employed in the surface acoustic wave part of FIG. 11, the demodulation in accordance with the QPSK scheme is enabled in a simple demodulator circuit configuration, and a SS communication system with a high transmission speed can be constructed.

While the seventh embodiment has been described in connection with a particular configuration in which a surface acoustic wave device is wire-bonded to and sealed in a can seal package, the present invention is not limited by the form of the sealing and mounting of the device. For example, the present invention can be implemented in any form of sealing and mounting techniques as required by particular applications, for example, by the use of a ceramic package or a molded package for sealing a surface acoustic wave device, by connecting the package and the substrate through flip-chip or TAB (Tape Automated Bonding) techniques, and so on.

According to the seventh embodiment as described above, since the surface acoustic wave device 91 is air-tight sealed within a package, the surface acoustic wave device 91 is isolated from the influence of external environment, thereby making it possible to stabilize the operation and extend the useful life of the surface acoustic wave device 91.

As described above, according to a spread spectrum communication apparatus of the present invention, the spread spectrum communication apparatus comprises first and second delay circuits for delaying an output signal from a correlated signal acquisition circuit and first and second adder circuits for adding the output signal of the correlated signal acquisition circuit and respective output signals of the first and second delay circuits, so that an in-phase component of original data can be demodulated from the first adder circuit and a quadrature component of the original data can be demodulated from the second adder circuit. Therefore, when the correlated signal acquisition circuit is implemented by a surface acoustic wave matched filter and the first and second delay circuits are implemented by surface acoustic wave delay lines, the present invention has an advantageous effect of enabling the demodulation in accordance with the QPSK scheme in a simple configuration using the surface acoustic wave matched filter and the surface acoustic wave delay lines.

Also, since the correlated signal acquisition circuit is implemented by a surface acoustic wave matched filter and the delay circuits are implemented by surface acoustic wave delay lines, a correlated signal can be acquired by the surface acoustic wave matched filter, and the correlated signal can be delayed by the surface acoustic wave delay lines, so that the present invention has an advantageous effect of enabling the demodulation in accordance with the QPSK scheme in a simple configuration using the surface acoustic wave matched filter and the surface acoustic wave delay lines.

Also, according to a surface acoustic wave device of the present invention, the surface acoustic wave device comprises a first output comb-shaped electrode formed on a piezo-electric substrate at a predetermined interval from a signal input coding electrode, and a second output comb-shaped electrode formed on the piezo-electric substrate at a distance of $T+(\pm n+5 \times a/8)/fc$ from the first output comb-shaped electrode (where T represents one period of a received signal to be demodulated; fc represents a carrier frequency of a signal inputted to the signal input coding electrode; n represents an integer including zero equal to or less than the value of (2×carrier frequency fc/chip rate); and a is a value in a range of $\frac{1}{2} \leq a \leq \frac{3}{2}$) and having the same polarity as the first output comb-shaped electrode, wherein the first output comb-shaped electrode and the second output comb-shaped electrode are connected in parallel on the piezo-electric substrate. Thus, the acquisition of a correlated signal by the surface acoustic wave matched filter, signal delays by the surface acoustic wave delay lines, and additions of the non-delayed signal and the respective delayed signals can be all performed on the single piezo-electric substrate, so that the present invention has an advantageous effect of enabling the formation of a surface acoustic wave device for the QPSK scheme having a surface acoustic wave matched filter and surface acoustic wave delay lines on a single substrate.

Further, another surface acoustic wave device of the present invention comprises a first output comb-shaped electrode formed on a piezo-electric substrate at a predetermined interval from a signal input coding electrode, and a second output comb-shaped electrode formed on the piezo-electric substrate at a distance of $T+(\pm m-5\times a/8)/fc$ from the first output comb-shaped electrode (where T represents one period of a received signal to be demodulated; fc represents a carrier frequency of a signal inputted to the signal input coding electrode; m represents an integer including zero equal to or less than the value of (2×carrier frequency fc/chip rate); and a is a value in a range of $\frac{1}{2} \leq a \leq \frac{3}{2}$) and having the same polarity as the first output comb-shaped electrode, wherein the first output comb-shaped electrode and the second output comb-shaped electrode are connected in parallel on the piezo-electric substrate. Thus, the acquisition of a correlated signal by the surface acoustic wave matched filter, signal delays by the surface acoustic wave delay lines, and additions of the non-delayed signal and the respective delayed signals can be all performed on the single piezo-electric substrate, so that the present invention has an advantageous effect of enabling the formation of a surface acoustic wave device for the QPSK scheme having a surface acoustic wave matched filter and surface acoustic wave delay lines on a single substrate.

Further, since the formation of the two surface acoustic wave devices having different delay amounts on the same substrate enables a SS signal for the QPSK scheme to be demodulated on the same substrate, the present invention has an advantageous effect of enabling the formation of a demodulator for a spread spectrum communication apparatus in a simple and compact configuration.

Furthermore, since the present invention employs double electrodes for the structure of electrodes in the surface acoustic wave device, unnecessary radiations can be suppressed, thereby making it possible to produce an advantageous effect of stabilizing an output signal.

According to a surface acoustic wave part of the present invention as described above, since a surface acoustic wave device is air-tight sealed in a package, external influences on the surface acoustic wave device can be suppressed, thereby making it possible to produce an advantageous effect of stabilizing the operation of the surface acoustic wave device.

Further, by employing the surface acoustic wave part having a surface acoustic wave device air-tight sealed therein for a SS demodulator, the present invention has an advantageous effect of enabling stabilization of the operation for demodulating a SS signal for the QPSK scheme.

Also, according to a surface acoustic wave device of the present invention, the surface acoustic wave device comprises a first output comb-shaped electrode formed on a piezo-electric substrate at a predetermined interval from a signal input coding electrode, and a second output comb-shaped electrode formed on the piezo-electric substrate at a distance of $T+(\pm n+a/8)/fc$ from the first output comb-shaped electrode (where T represents one period of a received signal to be demodulated; fc represents a carrier frequency of a signal inputted to the signal input coding electrode; n represents an integer including zero equal to or less than the value of (2×carrier frequency fc/chip rate); and a is a value in a range of $\frac{1}{2} \leq a \leq \frac{3}{2}$) and having the opposite polarity to the first output comb-shaped electrode, wherein the first output comb-shaped electrode and the second output comb-shaped electrode are connected in parallel on the piezo-electric substrate. Thus, the acquisition of a correlated signal by the surface acoustic wave matched filter, signal delays by the surface acoustic wave delay lines, and additions of the non-delayed signal and the respective delayed signals can be all performed on the single piezo-electric substrate, so that the present invention has an advantageous effect of enabling the formation of a surface acoustic wave device for the QPSK scheme having a surface acoustic wave matched filter and surface acoustic wave delay lines on a single substrate.

Further, another acoustic wave device according to the present invention comprises a first output comb-shaped electrode formed on a piezo-electric substrate at a predetermined interval from a signal input coding electrode, and a second output comb-shaped electrode formed on the piezo-electric substrate at a distance of $T+(\pm m-a/8)/fc$ from the first output comb-shaped electrode (where T represents one period of a received signal to be demodulated; fc represents a carrier frequency of a signal inputted to the signal input coding electrode; m represents an integer including zero equal to or less than the value of (2×carrier frequency fc/chip rate); and a is a value in a range of $\frac{1}{2} \leq a \leq \frac{3}{2}$) and having the opposite polarity to the first output comb-shaped electrode, wherein the first output comb-shaped electrode and the second output comb-shaped electrode are connected in parallel on the piezo-electric substrate. Thus, the acquisition of a correlated signal by the surface acoustic wave matched filter, signal delays by the surface acoustic wave delay lines, and additions of the non-delayed signal and the respective delayed signals can be all performed on the single piezo-electric substrate, so that the present invention has an advantageous effect of enabling the formation of a surface acoustic wave device for the QPSK scheme having a surface acoustic wave matched filter and surface acoustic wave delay lines on a single substrate.

What is claimed is:

1. A spread spectrum communication apparatus comprising:
    a spread spectrum modulator for converting transmission data into a spread spectrum signal using a predetermined code sequence; and
    a spread spectrum demodulator for demodulating a received spread spectrum signal to original data,
    wherein said spread spectrum demodulator comprises:
        a correlated signal acquisition circuit for demodulating said received spred spectrum signal to acquire a correlated signal;
        first and second delay circuits for delaying an output signal of said correlated signal acquisition circuit; and
        a first adder circuit for adding the output signal of said correlated signal acquisition circuit and an output signal of said first delay circuit; and
        a second adder circuit for adding the output signal of said correlated signal acquisition circuit and an output signal of said second delay circuit,
            said first delay circuit delaying an input signal by a time period expressed by $T+(\pm n+5\times a/8)/fc$, where T represents one period of a received signal to be demodulated; fc represents a carrier frequency of a signal inputted to said correlated signal acquisition circuit; n represents an integer including zero equal to or less than a value of (2×carrier frequency fc/chip rate); and a is a value in a range of ½≦a≦³⁄₂, and said second delay circuit delaying an input signal by a time period expressed by T+(±m−5×a/8)/fc, where m represents an integer including zero equal to or less than the value of (2×carrier frequency fc/chip rate).

2. A spread spectrum communication apparatus according to claim 1, wherein:

said correlated signal acquisition circuit comprises a surface acoustic wave matched filter; and said delay circuits each comprise a surface acoustic wave delay line.

3. A surface acoustic wave device comprising:

a piezo-electric substrate;

a signal input coding electrode formed on said piezo-electric substrate;

a first output comb-shaped electrode formed on said piezo-electric substrate at a predetermined interval from said signal input coding electrode; and a second output comb shaped electrode formed on said piezo-electric substrate at a distance of T+(±n+5×a/8)/fc from said first output comb-shaped electrode, where T represents one period of a received signal to be demodulated; fc represents a carrier frequency of a signal inputted to said signal input coding electrode; n represents an integer including zero equal to or less than a value of (2×carrier frequency fc/chip rate); and a is a value in a range of ½≦a≦³⁄₂, and having the same polarity as said first output comb-shaped electrode, wherein said first output comb-shaped electrode and said second output comb-shaped electrode are electrically connected on said piezo-electric substrate.

4. A surface acoustic wave device comprising:

a piezo-electric substrate;

a signal input coding electrode formed on said piezo-electric substrate;

a first output comb-shaped electrode formed on said piezo-electric substrate at a predetermined interval from said signal input coding electrode; and a second output comb-shaped electrode formed on said piezo-electric substrate at a distance of T+(±m−5×a/8)/fc from said first output comb-shaped electrode, where T represents one period of a received signal to be demodulated; fc represents a carrier frequency of a signal inputted to said signal input coding electrode; m represents an integer including zero equal to or less than a value of (2×carrier frequency fc/chip rate); and a is a value in a range of ½≦a≦³⁄₂, and having the same polarity as said first output comb-shaped electrode, wherein said first output comb-shaped electrode and said second output comb-shaped electrode are electrically connected on said piezo-electric substrate.

5. A surface acoustic wave device comprising said surface acoustic wave device according to claim 3 and said surface acoustic wave device according to claim 4, both of which are formed on the same substrate.

6. A surface acoustic wave device according to claim 3, wherein said electrodes have a double electrode structure.

7. A surface acoustic wave part having an air-tight sealed surface acoustic wave device according to claim 3.

8. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 7.

9. A surface acoustic wave device comprising:

a piezo-electric substrate;

a signal input coding electrode formed on said piezo-electric substrate;

a first output comb-shaped electrode formed on said piezo-electric substrate at a predetermined interval from said signal input coding electrode; and a second output comb-shaped electrode formed on said piezo-electric substrate at a distance of T+(±n+a/8)/fc from said first output comb-shaped electrode, where T represents one period of a received signal to be demodulated; fc represents a carrier frequency of a signal inputted to said signal input coding electrode; n represents an integer including zero equal to or less than a value of (2×carrier frequency fc/chip rate); and a is a value in a range of ½≦a≦³⁄₂, and having the opposite polarity to said first output comb-shaped electrode, wherein said first output comb-shaped electrode and said second output comb-shaped electrode are electrically connected on said piezo-electric substrate.

10. A surface acoustic wave device comprising:

a piezo-electric substrate;

a signal input coding electrode formed on said piezo-electric substrate;

a first output comb-shaped electrode formed on said piezo-electric substrate at a predetermined interval from said signal input coding electrode; and a second output comb-shaped electrode formed on said piezo-electric substrate at a distance of T+(±m−a/8)/fc from said first output comb-shaped electrode, where T represents one period of a received signal to be demodulated; fc represents a carrier frequency of a signal inputted to said signal input coding electrode; m represents an integer including zero equal to or less than a value of (2×carrier frequency fc/chip rate); and a is a value in a range of ½≦a≦³⁄₂, and having the opposite polarity to the first output comb-shaped electrode, wherein said first output comb-shaped electrode and said second output comb-shaped electrode are electrically connected on said piezo-electric substrate.

11. A surface acoustic wave device comprising said surface acoustic wave device according to claim 9 and said surface acoustic wave device according to claim 10, both of which are formed on the same substrate.

12. A surface acoustic wave device according to claim 9, wherein said electrodes have a double electrode structure.

13. A surface acoustic wave part having an airtight sealed surface acoustic wave device according to claim 9.

14. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 13.

15. A surface acoustic wave device according to claim 4, wherein said electrodes have a double electrode structure.

16. A surface acoustic wave device according to claim 5, wherein said electrodes have a double electrode structure.

17. A surface acoustic wave part having an airtight sealed surface acoustic wave device according to claim 4.

18. A surface acoustic wave part having an airtight sealed surface acoustic wave device according to claim 5.

19. A surface acoustic wave part having an airtight sealed surface acoustic wave device according to claim 6.

20. A surface acoustic wave part having an airtight sealed surface acoustic wave device according to claim 15.

21. A surface acoustic wave part having an airtight sealed surface acoustic wave device according to claim 16.

22. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 17.

23. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 18.

24. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 19.

25. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 20.

26. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 21.

27. A surface acoustic wave device according to claim 10, wherein said electrodes have a double electrode structure.

28. A surface acoustic wave device according to claim 11, wherein said electrodes have a double electrode structure.

29. A surface acoustic wave part having an airtight sealed surface acoustic wave device according to claim 10.

30. A surface acoustic wave part having an airtight sealed surface acoustic wave device according to claim 11.

31. A surface acoustic wave part having an airtight sealed surface acoustic wave device according to claim 12.

32. A surface acoustic wave part having an airtight sealed surface acoustic wave device according to claim 27.

33. A surface acoustic wave part having an airtight sealed surface acoustic wave device according to claim 28.

34. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 29.

35. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 30.

36. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 31.

37. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 32.

38. A spread spectrum communication apparatus comprising:

a spread spectrum modulator for converting transmission data into a spread spectrum signal using a predetermined code sequence; and a spread spectrum demodulator for demodulating a received spread spectrum signal to original data, wherein said spread spectrum demodulator includes said surface acoustic wave part according to claim 33.

* * * * *